(12) United States Patent
Lee et al.

(10) Patent No.: US 11,923,944 B2
(45) Date of Patent: Mar. 5, 2024

(54) METHOD AND APPARATUS FOR FREQUENCY SELECTIVE UL PRECODING

(71) Applicant: Samsung Electronics Co., Ltd., Suwon-si (KR)

(72) Inventors: Gilwon Lee, McKinney, TX (US); Eko Onggosanusi, Coppell, TX (US); Md. Saifur Rahman, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/664,826

(22) Filed: May 24, 2022

(65) Prior Publication Data

US 2022/0393742 A1   Dec. 8, 2022

Related U.S. Application Data

(60) Provisional application No. 63/214,093, filed on Jun. 23, 2021, provisional application No. 63/197,113, filed on Jun. 4, 2021.

(51) Int. Cl.
| | |
|---|---|
| *H04B 7/02* | (2018.01) |
| *H04B 7/0456* | (2017.01) |
| *H04B 7/06* | (2006.01) |
| *H04L 5/00* | (2006.01) |

(52) U.S. Cl.
CPC ......... *H04B 7/0639* (2013.01); *H04B 7/0456* (2013.01); *H04L 5/0094* (2013.01)

(58) Field of Classification Search
CPC .. H04B 7/0639; H04B 7/0456; H04B 7/0691; H04L 5/0094; H04L 27/2601; H04L 5/0023; H04L 5/0035; H04L 27/0008; H04L 27/2042; H04L 27/2067; H04L 27/362; H04L 5/0028; H04L 5/0092

USPC ........................................................ 375/267

See application file for complete search history.

(56) References Cited

U.S. PATENT DOCUMENTS

| | | | |
|---|---|---|---|
| 2015/0071253 A1* | 3/2015 | Zhou ...................... | H04B 7/043 370/335 |
| 2019/0097710 A1* | 3/2019 | Park ...................... | H04W 52/28 |
| 2019/0149365 A1* | 5/2019 | Chatterjee ........... | H04L 25/0226 370/329 |

(Continued)

OTHER PUBLICATIONS

International Search Report and Written Opinion dated Sep. 6, 2022 regarding International Application No. PCT/KR2022/007950, 7 pages.

(Continued)

*Primary Examiner* — Helene E Tayong

(57) ABSTRACT

Apparatuses and methods for frequency selective uplink precoding are provided. The method includes receiving configuration information about resource allocation for an uplink transmission, the configuration information indicating: allocated resources for uplink transmission, and uplink precoding information for G antenna port groups for the uplink transmission on the allocated resources, wherein the uplink precoding information indicates: SD basis vectors, FD basis vectors, coefficients for (SD, FD) basis vector pairs, and two components for the coefficients across the G antenna port groups; based on the uplink precoding information, applying uplink precoding for the G antenna port groups; and performing uplink transmission on the allocated resources according to the configuration information.

20 Claims, 19 Drawing Sheets

(56) References Cited

U.S. PATENT DOCUMENTS

2019/0305834 A1 10/2019 Fakoorian et al.
2020/0186303 A1 6/2020 Hao et al.

OTHER PUBLICATIONS

Ericsson, "On CSI enhancements for MU-MIMO", 3GPP TSG RAN WG1 Meeting RAN1#98, R1-1909523, Aug. 2019, 28 pages.
Catt, "Discussion on CSI enhancements for mTRP and FDD reciprocity", 3GPP TSG RAN WG1 Meeting #104b-e, R1-2102604, Apr. 2021, 14 pages.
"3rd Generation Partnership Project; Technical Specification Group Radio Access Network; Evolved Universal Terrestrial Radio Access (E-UTRA); Physical channels and modulation (Release 17)", 3GPP TS 36.211 V17.0.0, Dec. 2021, 250 pages.
"3rd Generation Partnership Project; Technical Specification Group Radio Access Network; Evolved Universal Terrestrial Radio Access (E-UTRA); Multiplexing and channel coding (Release 17)", 3GPP TS 36.212 V17.0.0, Dec. 2021, 258 pages.
"3rd Generation Partnership Project; Technical Specification Group Radio Access Network; Evolved Universal Terrestrial Radio Access (E-UTRA); Physical layer procedures (Release 17)", 3GPP TS 36.213 V17.0.0, Dec. 2021, 582 pages.
"3rd Generation Partnership Project; Technical Specification Group Radio Access Network; Evolved Universal Terrestrial Radio Access (E-UTRA); Medium Access Control (MAC) protocol specification (Release 17)", 3GPP TS 36.321 V17.0.0, Mar. 2022, 146 pages.
"3rd Generation Partnership Project; Technical Specification Group Radio Access Network; Evolved Universal Terrestrial Radio Access (E-UTRA); Radio Resource Control (RRC); Protocol specification (Release 17)", 3GPP TS 36.331 V17.0.0, Mar. 2022, 1119 pages.
"3rd Generation Partnership Project; Technical Specification Group Radio Access Network; NR; Physical channels and modulation (Release 17)", 3GPP TS 38.211 V17.0.0, Dec. 2021, 134 pages.
"3rd Generation Partnership Project; Technical Specification Group Radio Access Network; NR; Multiplexing and channel coding (Release 17)", 3GPP TS 38.212 V17.0.0, Dec. 2021, 190 pages.
"3rd Generation Partnership Project; Technical Specification Group Radio Access Network; NR; Physical layer procedures for control (Release 17)", 3GPP TS 38.213 V17.0.0, Dec. 2021, 225 pages.
"3rd Generation Partnership Project; Technical Specification Group Radio Access Network; NR; Physical layer for procedures for data (Release 17)", 3GPP TS 38.214 V17.0.0, Dec. 2021, 217 pages.
"3rd Generation Partnership Project; Technical Specification Group Radio Access Network; NR; Physical layer measurements (Release 17)", 3GPP TS 38.215 V17.0.0, Dec. 2021, 26 pages.
"3rd Generation Partnership Project; Technical Specification Group Radio Access Network; NR; Medium Access Control (MAC) protocol specification (Release 17)", 3GPP TS 38.321 V17.0.0, Mar. 2022, 221 pages.
"3rd Generation Partnership Project; Technical Specification Group Radio Access Network; NR; Radio Resource Control (RRC) protocol specification (Release 17)", 3GPP TS 38.331 V17.0.0, Mar. 2022, 1221 pages.

* cited by examiner

METHOD AND APPARATUS FOR FREQUENCY SELECTIVE UL PRECODING

CROSS-REFERENCE TO RELATED APPLICATIONS AND CLAIM OF PRIORITY

The present application claims priority to U.S. Provisional Patent Application No. 63/197,113, filed on Jun. 4, 2021; and U.S. Provisional Patent Application No. 63/214,093, filed on Jun. 23, 2021. The content of the above-identified patent document is incorporated herein by reference.

TECHNICAL FIELD

The present disclosure relates generally to wireless communication systems and more specifically to methods and apparatus for frequency selective uplink precoding.

BACKGROUND

For a cellular system operating in a sub-1 GHz frequency range (e.g., less than 1 GHz), supporting a large number of CSI-RS antenna ports (e.g., 32) at a single location or remote radio head (RRH) is challenging due to the fact that a larger antenna form factor size is needed at these frequencies than a system operating at a higher frequency such as 2 GHz or 4 GHz. At such low frequencies, the maximum number of CSI-RS antenna ports that can be co-located at a single site (or RRH) can be limited, for example to 8. This limits the spectral efficiency of such systems. In particular, the MU-MIMO spatial multiplexing gains offered due to large number of CSI-RS antenna ports (such as 32) can't be achieved. One way to operate a sub-1 GHz system with large number of CSI-RS antenna ports is based on distributing antenna ports at multiple locations (or panels/RRHs). The multiple sites or panels/RRHs can still be connected to a single (common) base unit, hence the signal transmitted/received via multiple distributed RRHs can still be processed at a centralized location.

SUMMARY

Embodiments of the present disclosure provide methods and apparatuses for frequency selective UL precoding in a wireless communication system.

In one embodiment, a UE in a wireless communication system is provided. The UE includes a transceiver configured to receive configuration information about resource allocation for an uplink transmission, the configuration information indicating: allocated resources for uplink transmission, and uplink precoding information for G antenna port groups for the uplink transmission on the allocated resources, wherein the uplink precoding information indicates: spatial-domain (SD) basis vectors, frequency domain (FD) basis vectors, coefficients for (SD, FD) basis vector pairs, and two components for the coefficients across the G antenna port groups. The UE further includes a processor operably coupled to the transceiver. The processor is configured, based on the uplink precoding information, to apply uplink precoding for the G antenna port groups. The transceiver is further configured to perform uplink transmission on the allocated resources according to the configuration information.

In another embodiment, a BS in a wireless communication system is provided. The BS includes a processor configured to generate configuration information about resource allocation for an uplink transmission, the configuration information indicating: allocated resources for uplink transmission, and uplink precoding information for G antenna port groups for the uplink transmission on the allocated resources, wherein the uplink precoding information indicates: SD basis vectors, FD basis vectors, coefficients for (SD, FD) basis vector pairs, and two components for the coefficients across the G antenna port groups. The BS further includes a transceiver operably coupled to the processor. The transceiver is configured to: transmit the configuration information; and receive the uplink transmission on the allocated resources according to the configuration information based on uplink precoding applied for the G antenna port groups and based on the uplink precoding information.

In yet another embodiment, a method for operating a UE is provided. The method comprises: receiving configuration information about resource allocation for an uplink transmission, the configuration information indicating: allocated resources for uplink transmission, and uplink precoding information for G antenna port groups for the uplink transmission on the allocated resources, wherein the uplink precoding information indicates: SD basis vectors, FD basis vectors, coefficients for (SD, FD) basis vector pairs, and two components for the coefficients across the G antenna port groups; based on the uplink precoding information, applying uplink precoding for the G antenna port groups; and performing uplink transmission on the allocated resources according to the configuration information.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
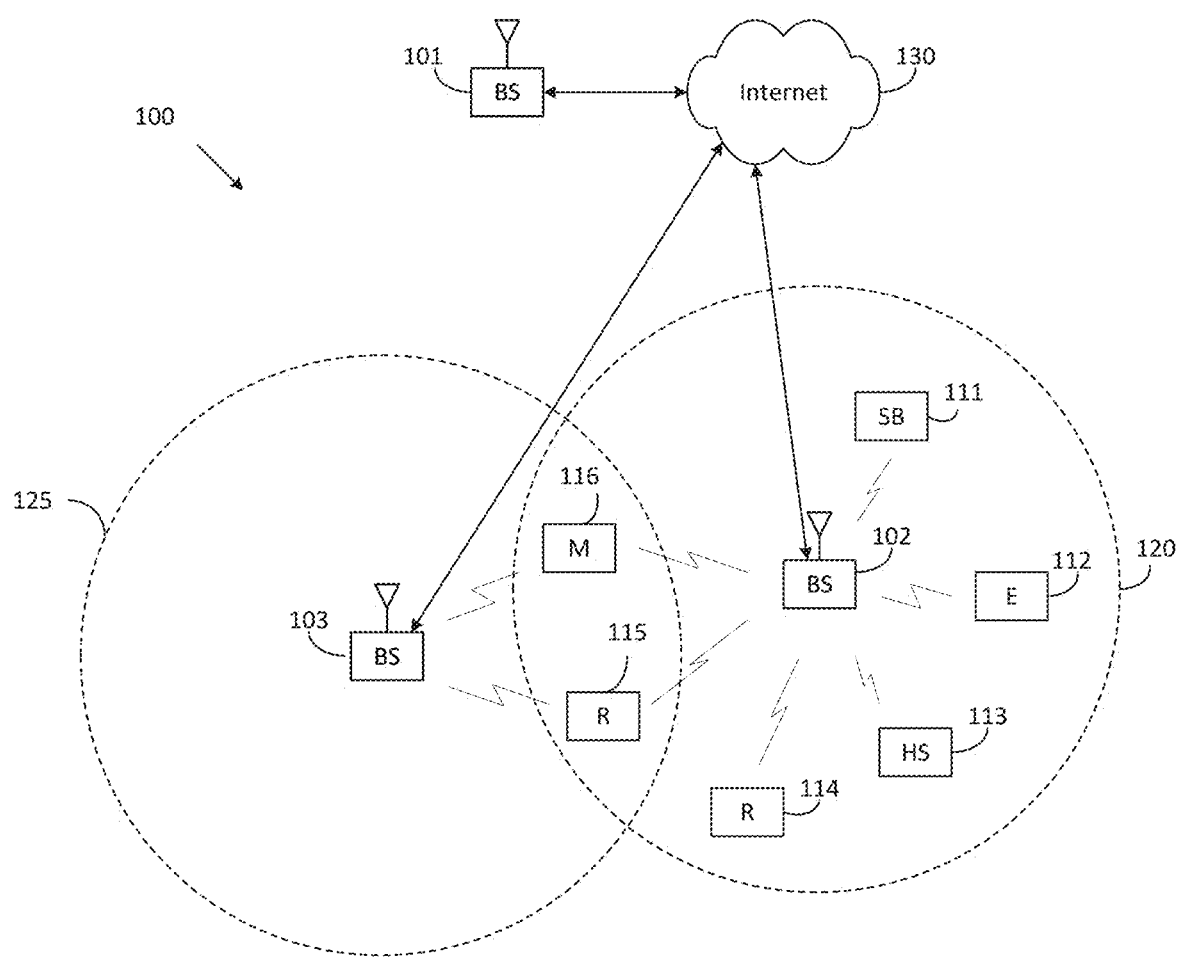
FIG. 1 illustrates an example wireless network according to embodiments of the present disclosure.

FIG. 1 through FIG. 23, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v17.0.0, "E-UTRA, Physical channels and modulation" (herein "REF 1"); 3GPP TS 36.212 v17.0.0, "E-UTRA, Multiplexing and Channel coding" (herein "REF 2"); 3GPP TS 36.213 v17.0.0, "E-UTRA, Physical Layer Procedures" (herein "REF 3"); 3GPP TS 36.321 v17.0.0, "E-UTRA, Medium Access Control (MAC) protocol specification" (herein "REF 4"); 3GPP TS 36.331 v17.0.0, "E-UTRA, Radio Resource Control (RRC) protocol specification" (herein "REF 5"); 3GPP TS 38.211 v17.0.0, "NR, Physical channels and modulation" (herein "REF 6"); 3GPP TS 38.212 v17.0.0, "E-UTRA, NR, Multiplexing and channel coding" (herein "REF 7"); 3GPP TS 38.213 v17.0.0, "NR, Physical Layer Procedures for Control" (herein "REF 8"); 3GPP TS 38.214 v17.0.0; "NR, Physical Layer Procedures for Data" (herein "REF 9"); 3GPP TS 38.215 v17.0.0, "NR, Physical Layer Measurements" (herein "REF 10"); 3GPP TS 38.321 v17.0.0, "NR, Medium Access Control (MAC) protocol specification" (herein "REF 11"); 3GPP TS 38.331 v17.0.0, and "NR, Radio Resource Control (RRC) Protocol Specification" (herein "REF 12").

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
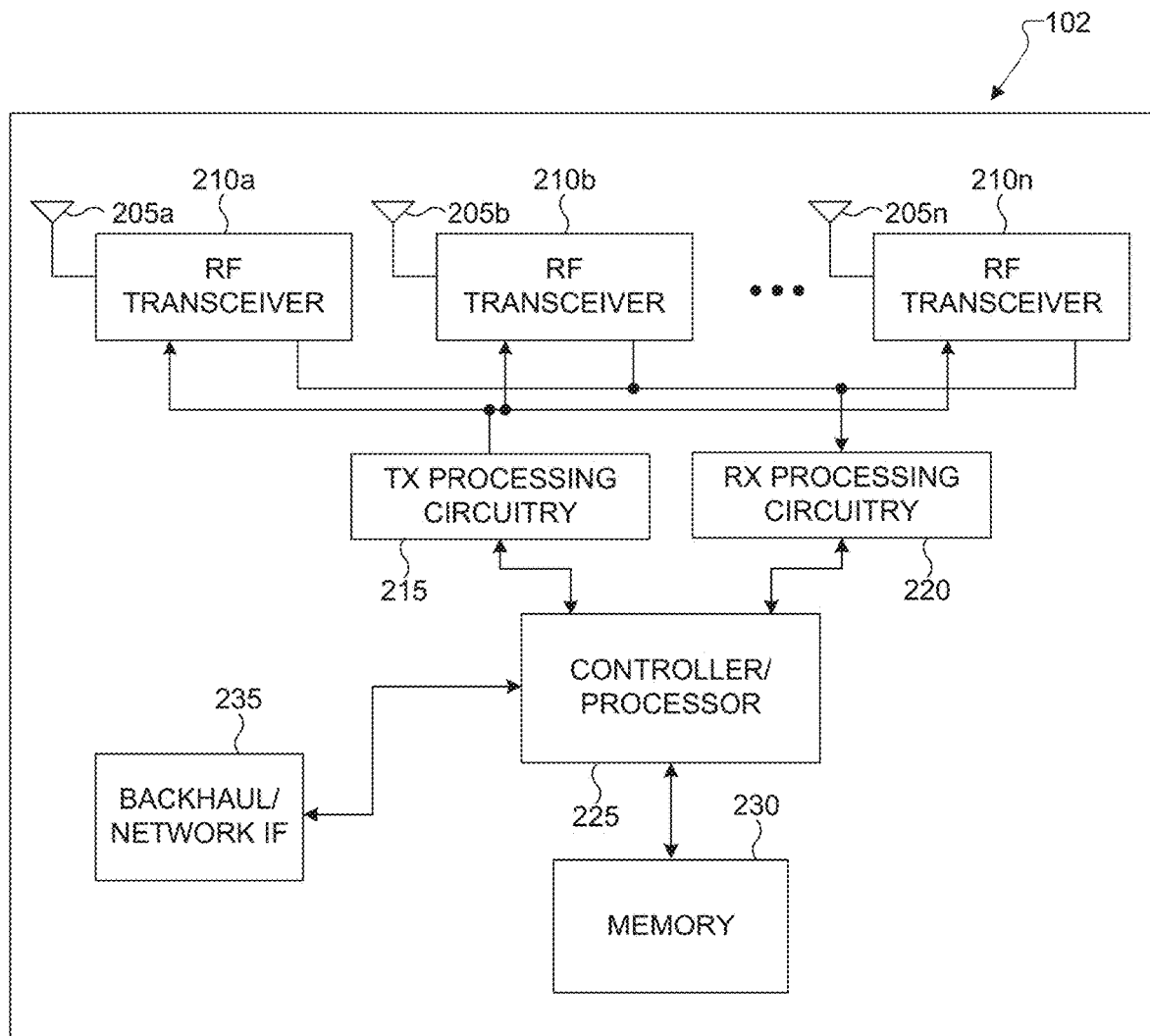
FIG. 2 illustrates an example gNB according to embodiments of the present disclosure.
Figure 3:
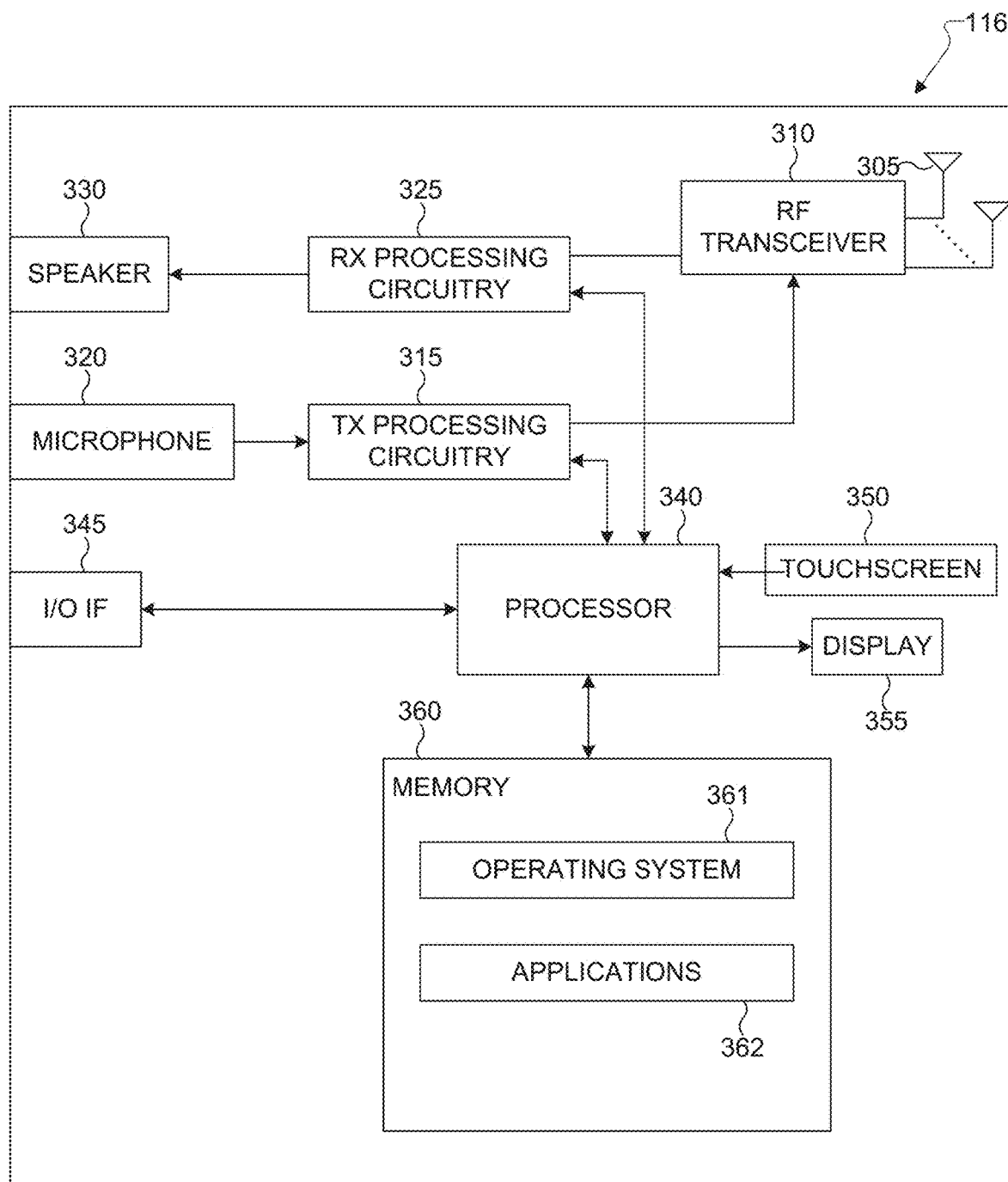
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system. The present disclosure covers several components which can be used in conjunction or in combination with one another or can operate as standalone schemes.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for receiving configuration information about resource allocation for an uplink transmission, the configuration information including: allocated resources for uplink transmission, and uplink precoding information for G antenna port groups for the uplink transmission on the allocated resources, wherein the uplink precoding information includes: spatial-domain (SD) basis vectors, frequency domain (FD) basis vectors, coefficients for (SD, FD) basis vector pairs, and two components for the coefficients across the G antenna port groups; based on the uplink precoding information, applying uplink precoding for the G antenna port groups; and performing uplink transmission on the allocated resources according to the configuration information. One or more of the gNBs 101-103 includes circuitry, programing, or a combination thereof, for generating configuration information about resource allocation for an uplink transmission, the configuration information including: allocated resources for uplink transmission, and uplink precoding information for G antenna port groups for the uplink transmission on the allocated resources, wherein the uplink precoding information includes: spatial-domain (SD) basis vectors, frequency domain (FD) basis vectors, coefficients for (SD, FD) basis vector pairs, and two components for the coefficients across the G antenna port groups; transmitting the configuration information; and receiving the uplink transmission on the allocated resources according to the configuration information based on uplink precoding applied for the G antenna port groups and based on the uplink precoding information.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of DL channel signals and the transmission of UL channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNB s over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for receiving configuration information about resource allocation for an uplink transmission, the configuration information including: allocated resources for uplink transmission, and uplink precoding information for G antenna port groups for the uplink transmission on the allocated resources, wherein the uplink precoding information includes: spatial-domain (SD) basis vectors, frequency domain (FD) basis vectors, coefficients for (SD, FD) basis vector pairs, and two components for the coefficients across the G antenna port groups; based on the uplink precoding information, applying uplink precoding for the G antenna port groups; and performing uplink transmission on the allocated resources according to the configuration information. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
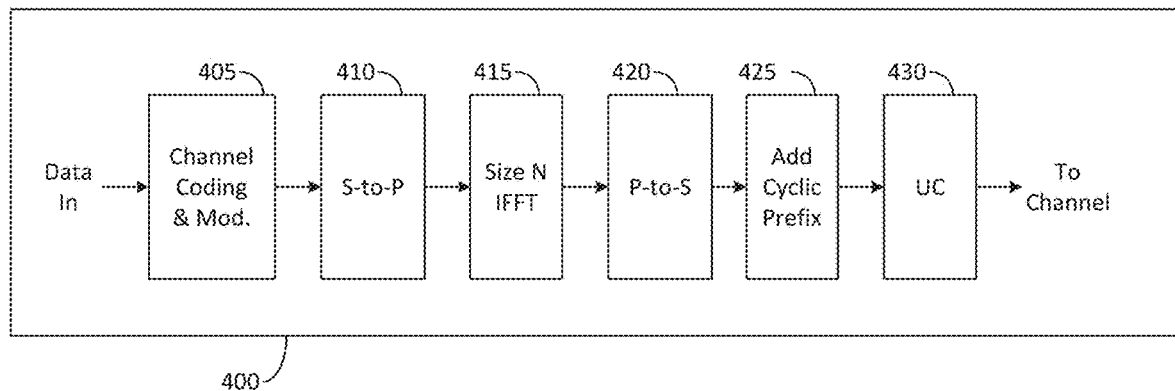
FIG. 4A illustrates a high-level diagram of an orthogonal frequency division multiple access transmit path according to embodiments of the present disclosure.
Figure 4B:
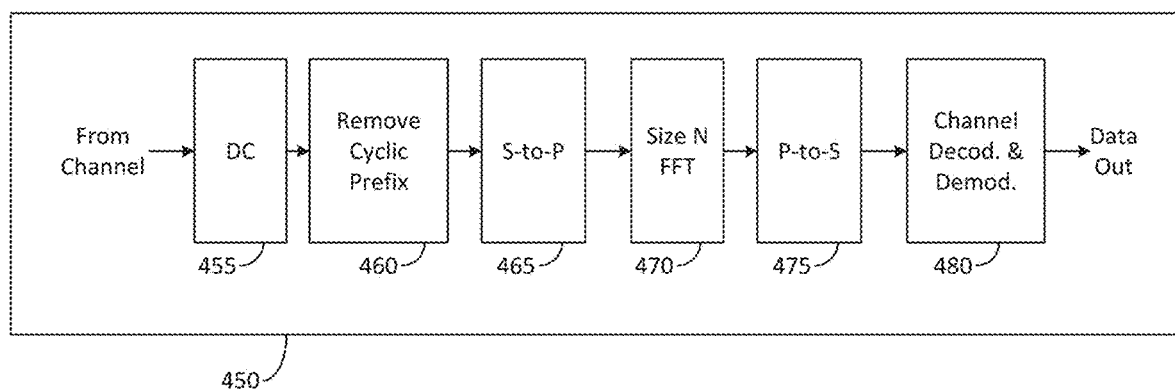
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency and removes cyclic prefix block 460 and removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra-reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{EPDCCH}$ sub-carriers, or resource elements (REs), such as 12 REs. A unit of one RB over one subframe is referred to as a PRB. A UE can be allocated $n_s=(n_{s0}+y \cdot N_{EPDCCH})$ mod D RBs for a total of $Z=O_F+\lfloor n_{s0}+y \cdot N_{EPDCCH})/D \rfloor$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is an RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figure 5:
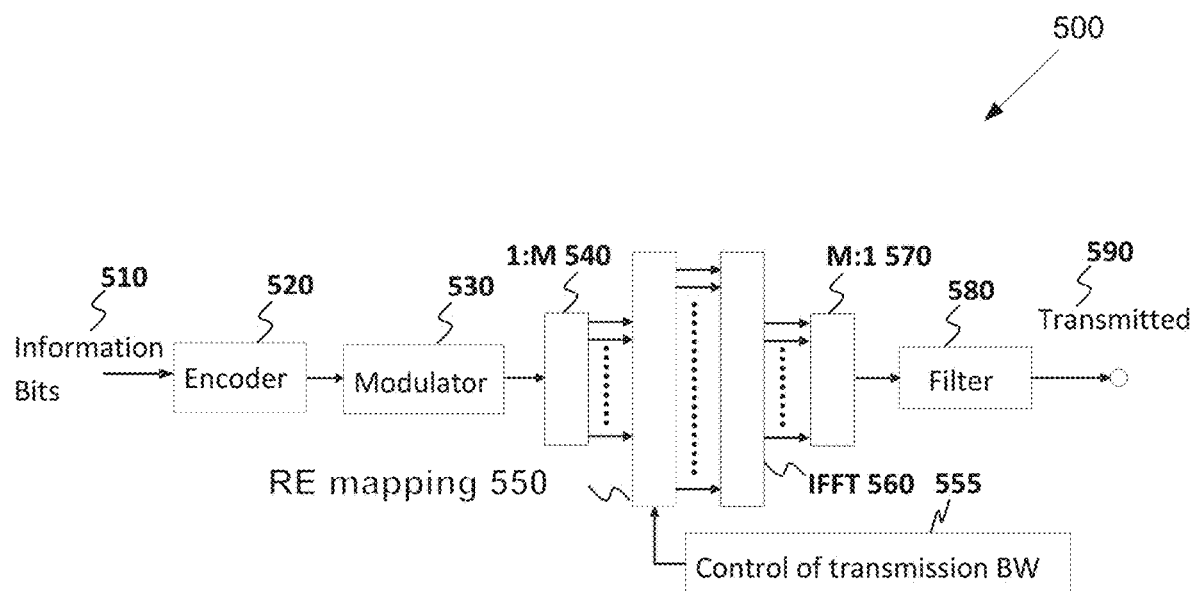
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. One or more of the components illustrated in FIG. 5 can be implemented in specialized circuitry configured to perform the noted functions or one or more of the components can be implemented by one or more processors executing instructions to perform the noted functions. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
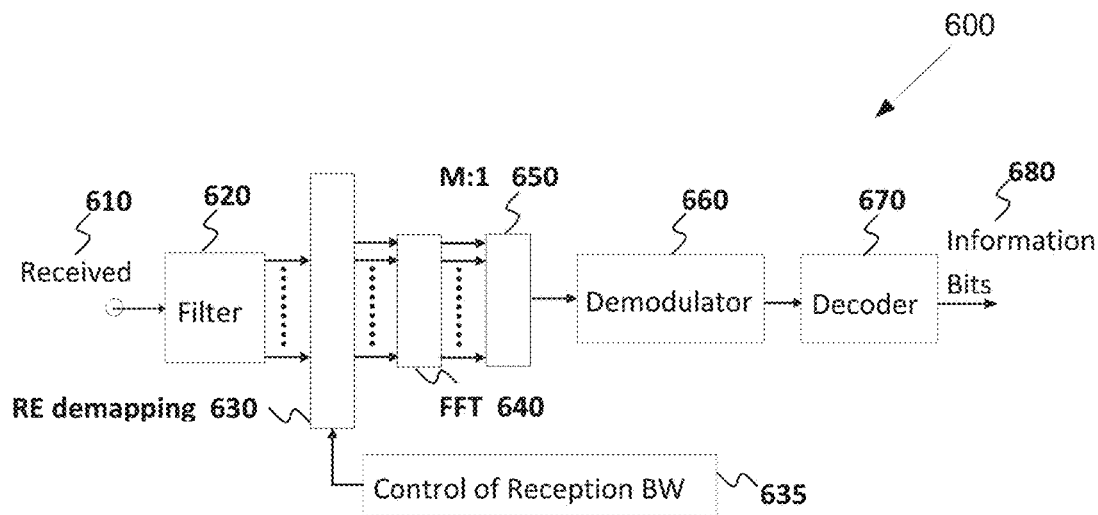
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. One or more of the components illustrated in FIG. 6 can be implemented in specialized circuitry configured to perform the noted functions or one or more of the components can be implemented by one or more processors executing instructions to perform the noted functions. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
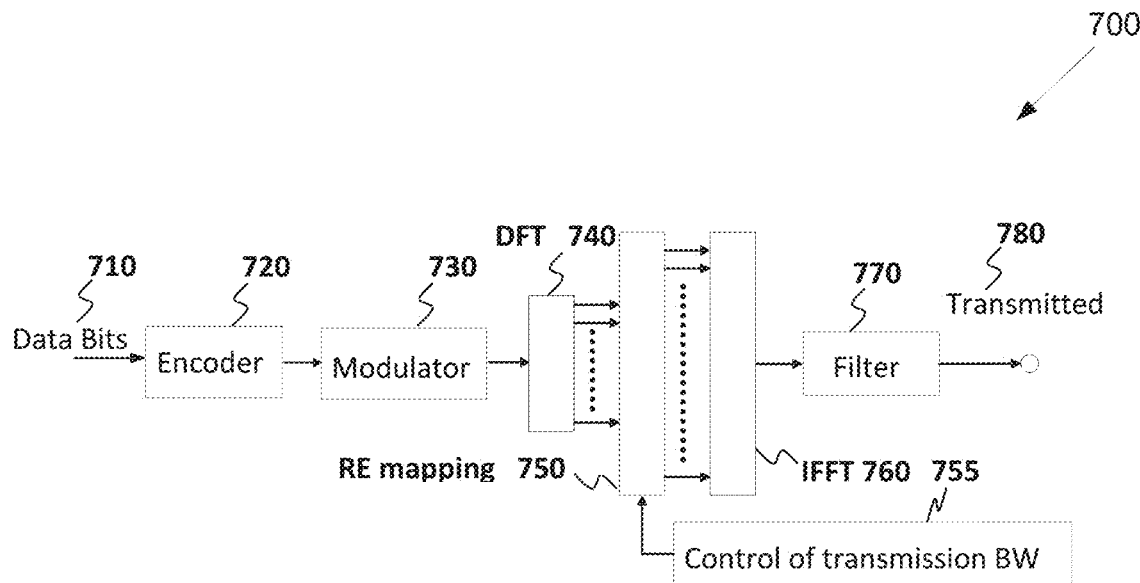
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. One or more of the components illustrated in FIG. 7 can be implemented in specialized circuitry configured to perform the noted functions or one or more of the components can be implemented by one or more processors executing instructions to perform the noted functions. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
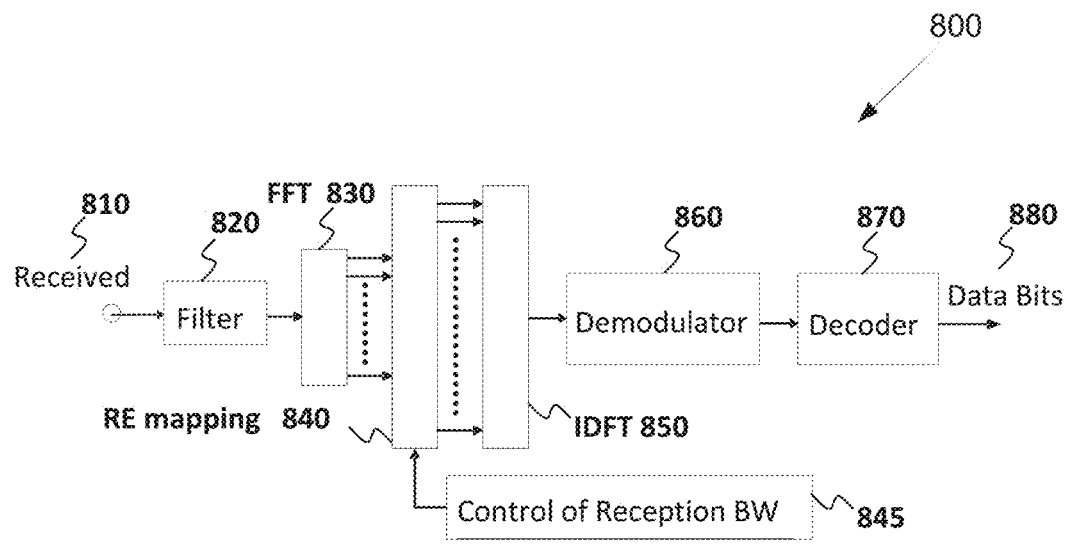
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. One or more of the components illustrated in FIG. 8 can be implemented in specialized circuitry configured to perform the noted functions or one or more of the components can be implemented by one or more processors executing instructions to perform the noted functions. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

Figure 9:
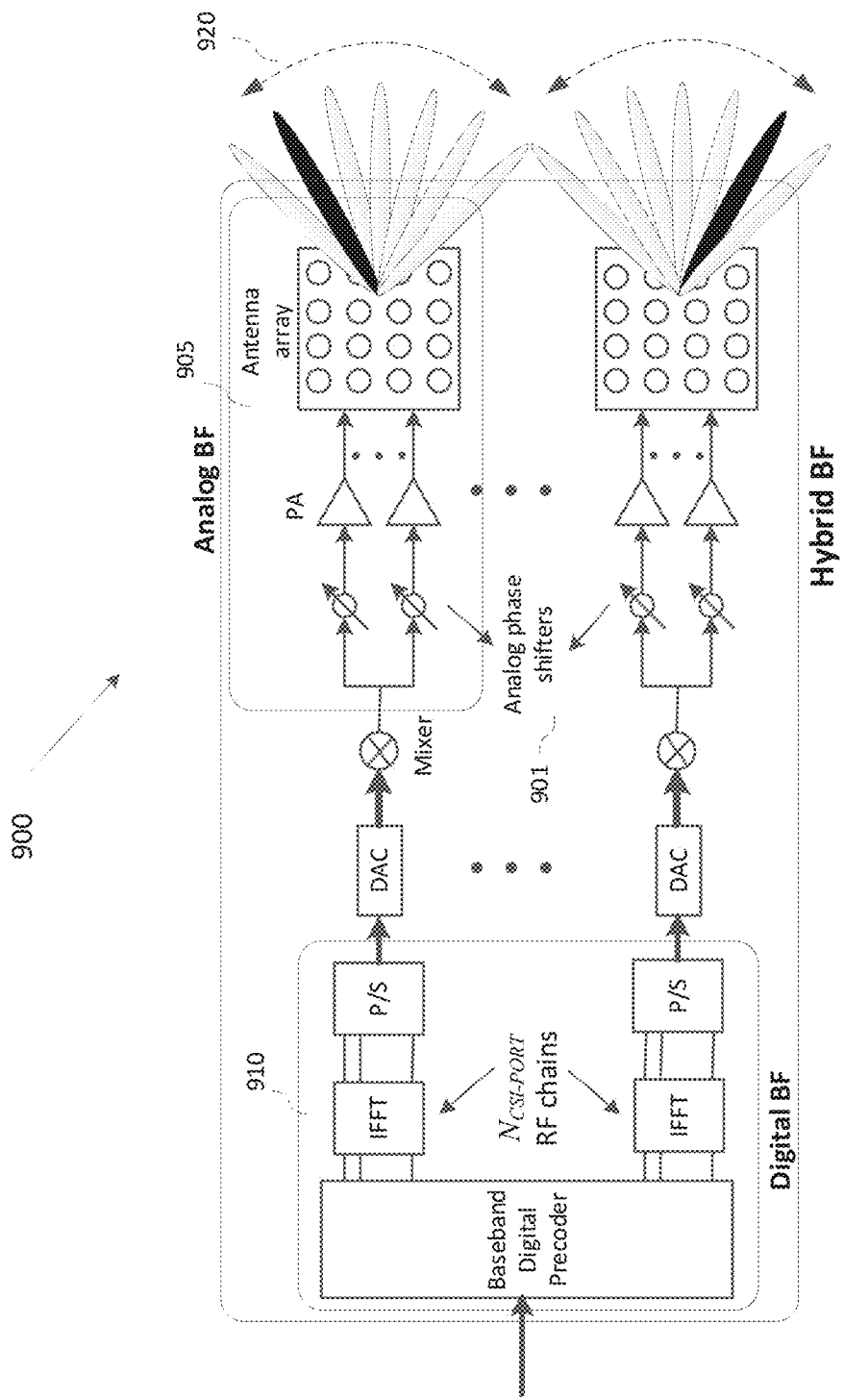
FIG. 9 illustrates an example antenna blocks or arrays forming beams according to embodiments of the present disclosure.

FIG. 9 illustrates an example antenna blocks or arrays 900 according to embodiments of the present disclosure. The embodiment of the antenna blocks or arrays 900 illustrated in FIG. 9 is for illustration only. FIG. 9 does not limit the scope of this disclosure to any particular implementation of the antenna blocks or arrays 900.

Rel.14 LTE and Rel.15 NR specifications support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 9. In this case, one CSI-RS port is mapped onto a large number of antenna elements which can be controlled by a bank of analog phase shifters 901. One CSI-RS port can then correspond to one sub-array which produces a narrow analog beam through analog beamforming 905. This analog beam can be configured to sweep across a wider range of angles (920) by varying the phase shifter bank across symbols or subframes. The number of sub-arrays (equal to the number of RF chains) is the same as the number of CSI-RS ports $N_{CSI-PORT}$. A digital beamforming unit 910 performs a linear combination across $N_{CSI-PORT}$ analog beams to further increase precoding gain. While analog beams are wideband (hence not frequency-selective), digital precoding can be varied across frequency sub-bands or resource blocks. Receiver operation can be conceived analogously.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

The above system is also applicable to higher frequency bands such as >52.6 GHz (also termed the FR4). In this case, the system can employ only analog beams. Due to the O2 absorption loss around 60 GHz frequency (~10 dB additional loss @ 100 m distance), larger number of and sharper analog beams (hence larger number of radiators in the array) will be needed to compensate for the additional path loss.

In the present disclosure, the frequency resolution (reporting granularity) and span (reporting bandwidth) of CSI or calibration coefficient reporting can be defined in terms of frequency "subbands" and "CSI reporting band" (CRB), respectively.

A subband for CSI or calibration coefficient reporting is defined as a set of contiguous PRBs which represents the smallest frequency unit for CSI or calibration coefficient reporting. The number of PRBs in a subband can be fixed for a given value of DL system bandwidth, configured either semi-statically via higher-layer/RRC signaling, or dynamically via L1 DL control signaling or MAC control element (MAC CE). The number of PRBs in a subband can be included in CSI or calibration coefficient reporting setting.

"CSI or calibration coefficient reporting band" is defined as a set/collection of subbands, either contiguous or non-contiguous, wherein CSI or calibration coefficient reporting is performed. For example, CSI or calibration coefficient reporting band can include all the subbands within the DL system bandwidth. This can also be termed "full-band". Alternatively, CSI or calibration coefficient reporting band can include only a collection of subbands within the DL system bandwidth. This can also be termed "partial band".

The term "CSI or calibration coefficient reporting band" is used only as an example for representing a function. Other terms such as "CSI or calibration coefficient reporting subband set" or "CSI or calibration coefficient reporting bandwidth" can also be used.

In terms of UE configuration, a UE can be configured with at least one CSI or calibration coefficient reporting band. This configuration can be semi-static (via higher-layer signaling or RRC) or dynamic (via MAC CE or L1 DL control signaling). When configured with multiple (N) CSI or calibration coefficient reporting bands (e.g., via RRC signaling), a UE can report CSI associated with n≤N CSI reporting bands. For instance, >6 GHz, large system bandwidth may require multiple CSI or calibration coefficient reporting bands. The value of n can either be configured semi-statically (via higher-layer signaling or RRC) or dynamically (via MAC CE or L1 DL control signaling). Alternatively, the UE can report a recommended value of n via an UL channel.

Therefore, CSI parameter frequency granularity can be defined per CSI reporting band as follows. A CSI parameter is configured with "single" reporting for the CSI reporting band with $M_n$ subbands when one CSI parameter for all the $M_n$ subbands within the CSI reporting band. A CSI parameter is configured with "subband" for the CSI reporting band with $M_n$ subbands when one CSI parameter is reported for each of the $M_n$ subbands within the CSI reporting band.

In NR, there are three types of UL resource allocation schemes, namely Type-0, Type-1, and Type-2. In UL resource allocation of Type 0, the resource block assignment information includes a bitmap indicating the Resource Block Groups (RBGs) that are allocated to the scheduled UE where a RBG is a set of consecutive resource blocks defined by higher layer parameter rbg-Size configured in pusch-Config and the size of the bandwidth part as defined in Table 1.

TABLE 1

| | Nominal RBG size P | |
|---|---|---|
| Bandwidth Part Size | Configuration 1 | Configuration 2 |
| 1-36 | 2 | 4 |
| 37-72 | 4 | 8 |
| 73-144 | 8 | 16 |
| 145-275 | 16 | 16 |

In uplink resource allocation of type 1, the resource block assignment information indicates to a scheduled UE a set of contiguously allocated non-interleaved resource blocks within the active bandwidth part of size $N_{BWP}^{size}$ PRBs except for the case when DCI format 0_0 is decoded in any common search space in which case the size of the initial UL bandwidth part $N_{BWP,0}^{size}$ shall be used.

An uplink type 1 resource allocation field consists of a resource indication value (RIV) corresponding to a starting virtual resource block ($RB_{start}$) and a length in terms of contiguously allocated resource blocks $L_{RBs}$.

For uplink type 2 resource allocation, please refer to [9] in detail.

In NR, TPMI is indicated to the UE through DCI scheduling uplink transmission or high layer parameters, and the UL precoding corresponding to the indicated TPMI is applied in the wideband manner, i.e., the UL precoding is used for all of the allocated UL resource blocks for UL transmission. In other words, indicating different UL precoding for different resource blocks is not supported in NR yet.

This disclosure introduces several components to support frequency-selective UL precoding, allowing to indicate different UL precoding per different RB, RBG, or other granularity.

Figure 10:
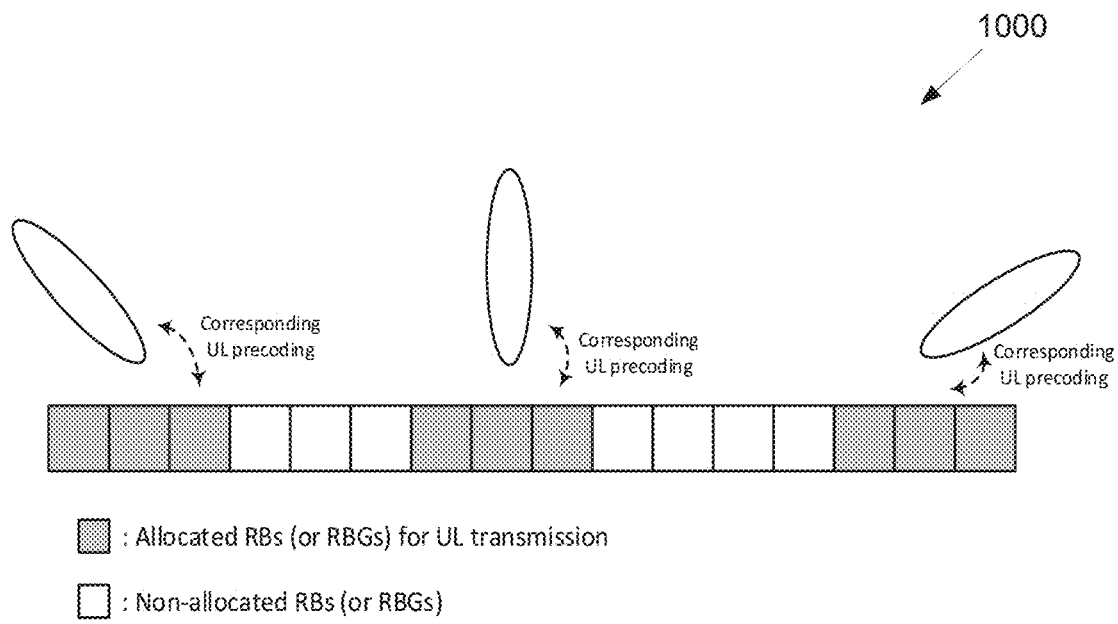
FIG. 10 illustrates an example of frequency-selective UL precoding according to embodiments of the present disclosure.

FIG. 10 illustrates an example of frequency-selective UL precoding 1000 according to embodiments of the present disclosure. The embodiment of the frequency-selective UL precoding 1000 illustrated in FIG. 10 is for illustration only. FIG. 10 does not limit the scope of this disclosure to any particular implementation of the frequency-selective UL precoding 1000.

As shown in FIG. 10, there are three different UL precoding matrices or vectors (expressed as different beam directions in the figure) that are corresponding to different RBs (or RBG, etc) of the allocated RBs.

Although this disclosure focuses on frequency selective UL precoding for Type-0 and Type-1 UL resource allocation methods, the same approaches of this disclosure can be applied Type-2 UL resource allocation method.

In one embodiment I, a UE is configured or indicated to use frequency selective UL precoding for the allocated resource blocks using Type-0 resource allocation for UL transmission. DCI, MAC-CE, or high layer parameters can be used to configure/indicate UE to use frequency selective UL precoding.

In one embodiment I.1, the granularity of frequency selective UL precoding is RBG, which is the same size of the granularity of UL resource allocation of Type 0.

In one example I.1.1, frequency selective UL precoding is indicated by using a parameter to contain TPMI sequence (or TPMI tuple) comprising of multiple TPMI indices, wherein the number of elements in the TPMI sequence is the number of the allocated RBGs $N_{RBG,alloc}$ in the bit-map, i.e., the number of is (which are corresponding to the allocated RBGs) in the bit-map for Type-0 resource allocation. An example is shown in Table 2. In this case, the number of TPMI indices is four.

TABLE 2

An example of indication for frequency selective UL precoding

| Bitmap for UL resource allocation | | | | | | | |
|---|---|---|---|---|---|---|---|
| 1 | 0 | 0 | 1 | 0 | 0 | 1 | 1 |
| TPMI index 8 | N/A | N/A | 3 | N/A | N/A | 23 | 23 |

In one example, the mapping of each element in TPMI sequence to the bitmap for UL resource allocation is done in a way that the first TPMI index in the TPMI sequence corresponds to the first 1 (from the MSB) in the bit-map, the second TPM index in the TPMI sequence corresponds to the second 1 in the bit-map, and so on.

In another example, the mapping of each element in TPMI sequence to the bitmap for UL resource allocation is done in a way that the first TPMI index in the TPMI sequence corresponds to the last 1 (from the MSB) in the bit-map, the second TPM index in the TPMI sequence corresponds to the second last 1 in the bit-map, and so on.

In one example 1.1.2, frequency selective UL precoding is indicated by a parameter to contain TPMI sequence (or TPMI tuple) comprising of multiple TPMI indices, wherein the number of elements in the TPMI sequence does not have to be the same as the number of the allocated RBGs in the bit-map.

In one example 1.1.2.1, TPMI in the TPMI sequence is indicated only when the TPMI corresponding to the previous allocated RBG is not the same as the TPMI corresponding to the current allocated RBG. In one example, the RBGs that are not having indicated TPMIs are regarded to have the same TPMIs that are indicated for the nearest RBGs from their RBGs among the previous allocated RBGs. An example is shown in Table. 3, and in this example, the RBGs corresponding to the second and third 1s are assigned with TPMI index 3 and the RBG corresponding to the fifth 1 is assigned with TPMI index 6. In one example, the TPMI corresponding to the first allocated RBG should be assigned.

In one example, a bitmap indicator with size of the allocated RBGs is used to indicate whether TPMI index exists or not. In one example, 1 refers to TPMI index is included, and 0 refers to TPMI index is not included.

TABLE 3

An example of indication for frequency selective UL precoding

| Bitmap for UL resource allocation | | | | | | | |
|---|---|---|---|---|---|---|---|
| 0 | 1 | 1 | 1 | 1 | 0 | 1 | 1 |
| TPMI index N/A | 3 | — | — | 6 | N/A | — | 22 |

In one embodiment I.2, the granularity of frequency selective UL precoding is RB.

In one example I.2.1, frequency selective UL precoding is indicated by using a parameter to contain TPMI sequence (or TPMI tuple) comprising of multiple TPMI indices, wherein the number of elements in the TPMI sequence is $N_{RBG,alloc} \times P$, where $N_{RBG,alloc}$ is the number of the allocated RBGs (i.e., the number of is in the RBG bit-map) and P is the number of RBs in each RBG. Table 4 shows an example when P=2.

TABLE 4

An example of indication for frequency selective UL precoding

| Bitmap for UL resource allocation | | | | | | | | | | | | | | | |
|---|---|---|---|---|---|---|---|---|---|---|---|---|---|---|---|
| 0 | | 1 | | 1 | | 0 | | 1 | | 1 | | 0 | | 1 | |
| TPMI index N/A | N/A | 25 | 3 | 7 | 8 | N/A | N/A | 6 | 1 | 14 | 9 | N/A | N/A | 21 | 19 |

In one example 1.2.2, frequency selective UL precoding is indicated by a parameter to contain TPMI sequence (or TPMI tuple) comprising of multiple TPMI indices, wherein the number of elements in the TPMI sequence does not have to be the same as $N_{RBG,alloc} \times P$ In one example I.2.2.1, TPMI in the TPMI sequence is indicated only when the TPMI corresponding to the previous allocated RB is not the same as the TPMI corresponding to the current allocated RB. In one example, the RBs that are not having indicated TPMIs are regarded to have the same TPMIs that are indicated for the nearest RBs from their RBs among the previous allocated RBs. An example is shown in Table. 5 when P=2, and, in this example, the RBs corresponding to the second, third, fourth, and fifth RBs under the first/second/third allocated RBGs are assigned with TPMI index 25, and the seventh RB under the fourth allocated RBG is assigned with TPMI index 19, and the ninth and tenth RBs under the fifth RBG are assigned with TPMI 21. In one example, the TPMI corresponding to the first allocated RBG should be assigned.

TABLE 5

An example of indication for frequency selective UL precoding

| Bitmap for UL resource allocation | | | | | | | | | | | | | | | |
|---|---|---|---|---|---|---|---|---|---|---|---|---|---|---|---|
| 0 | | 1 | | 1 | | 1 | | 0 | | 0 | | 1 | | 1 | |
| TPMI index N/A | N/A | 25 | — | — | — | — | 19 | N/A | N/A | N/A | N/A | — | 21 | — | — |

In one example, a bitmap indicator with the size of the allocated RBs (i.e., $N_{RBG,alloc} \times P$) is used to indicate whether TPMI index exists or not. In one example, 1 refers to TPMI index is included, and 0 refers to TPMI index is not included.

In another example, a bitmap indicator A with the size of the allocated RBGs (i.e., $N_{RBG,alloc}$) is used to indicate whether at least one TPMI index exists or not in the RB-level under the RBGs. In one example, 1 refers to that some of the RBs under the corresponding RBG have TPMI index, and 0 refers to that no RB has TPMI index. In one example, another bit-map B with the size of $N_{RBG,alloc,TPMI} \times P$ is used to indicate whether TPMI index is contained or not for each RB, where $N_{RBG,alloc,TPMI}$ is the number of the allocated RBGs having at least one TPMI index in the RB-level under the RBGs (i.e., is in bitmap indicator A).

In one embodiment 1.3, the total number of TPMI indices M to indicate for the allocated RBGs is fixed, determined in a rule, or configured. For example, M=2. In another example, M={1,2,3,4} and one of the values is configured via DCI or higher-layer parameters.

In one example 1.3.1, a parameter to indicate which M RBGs out of the $N_{RBG,alloc}$ allocated RBGs are linked with M TPMI indices is used. In one example, M RBGs can be indicated via a bitmap. In another example, a parameter having the cardinality of $$\binom{N_{RBG,alloc}}{M}$$

(i.e., $N_{RBG,alloc}$ choose M) can be used. In one example, the locations of M RBGs are pre-determined or follow a pre-determined rule. In one example, the RBGs that are not linked with the TPMIs are regarded to have the same TPMIs that are indicated for the nearest RBGs from their RBGs among the previous allocated RBGs.

In one example 1.3.2, a parameter to indicate which M RBs out of the $N_{RBG,alloc} \times P$ allocated RBs are linked with M TPMI indices is used. In one example, M RBs can be indicated via a bitmap. In another example, a parameter having the cardinality of $$\binom{N_{RBG,alloc} \times P}{M}$$

(i.e., $N_{RBG,alloc} \times P$ choose M) can be used. In one example, the locations of M RBs are pre-determined or follow a pre-determined rule. In one example, the RBs that are not linked with the TPMIs are regarded to have the same TPMIs that are indicated for the nearest RBs from their RBs among the previous allocated RBs.

Figure 11:
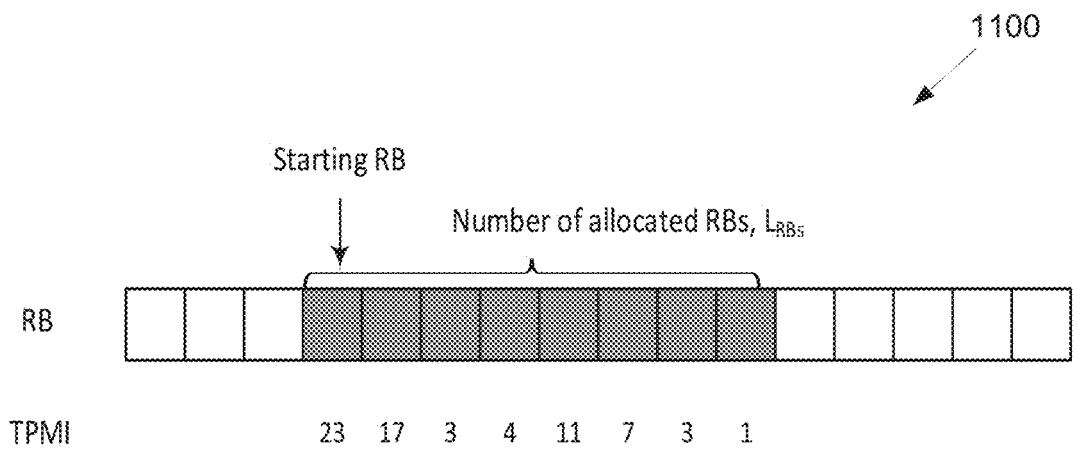
FIG. 11 illustrates an example of frequency-selective UL precoding for Type-1 resource allocation according to embodiments of the present disclosure.

FIG. 11 illustrates an example of frequency-selective UL precoding for Type-1 resource allocation 1100 according to embodiments of the present disclosure. The embodiment of the frequency-selective UL precoding for Type-1 resource allocation 1100 illustrated in FIG. 11 is for illustration only. FIG. 11 does not limit the scope of this disclosure to any particular implementation of the frequency-selective UL precoding for Type-1 resource allocation 1100.

In one embodiment II, a UE is configured or indicated to use frequency selective UL precoding for the allocated resource blocks using Type-1 resource allocation for UL transmission. DCI, MAC-CE, or high layer parameters can be used to configure/indicate UE to use frequency selective UL precoding.

In one embodiment II.1, the granularity of frequency selective UL precoding is RB.

In one example II.1.1, frequency selective UL precoding is indicated by using a parameter to contain TPMI sequence (or TPMI tuple) comprising of multiple TPMI indices, wherein the number of elements in the TPMI sequence is the number of the allocated RBs, i.e., $L_{RBS}$ which can be obtained from RIV in UL Type-1 resource allocation. An example is shown in FIG. 11.

In one example, the mapping of each element in TPMI sequence to the allocated RBs for UL resource allocation is done in a way that the first TPMI index in the TPMI sequence corresponds to the starting (first) RB, the second TPM index in the TPMI sequence corresponds to the second RB, and so on.

In one example, the mapping of each element in TPMI sequence to the allocated RBs for UL resource allocation is done in a way that the first TPMI index in the TPMI sequence corresponds to the last RB, the second TPM index in the TPMI sequence corresponds to the second last RB, and so on.

Figure 12:
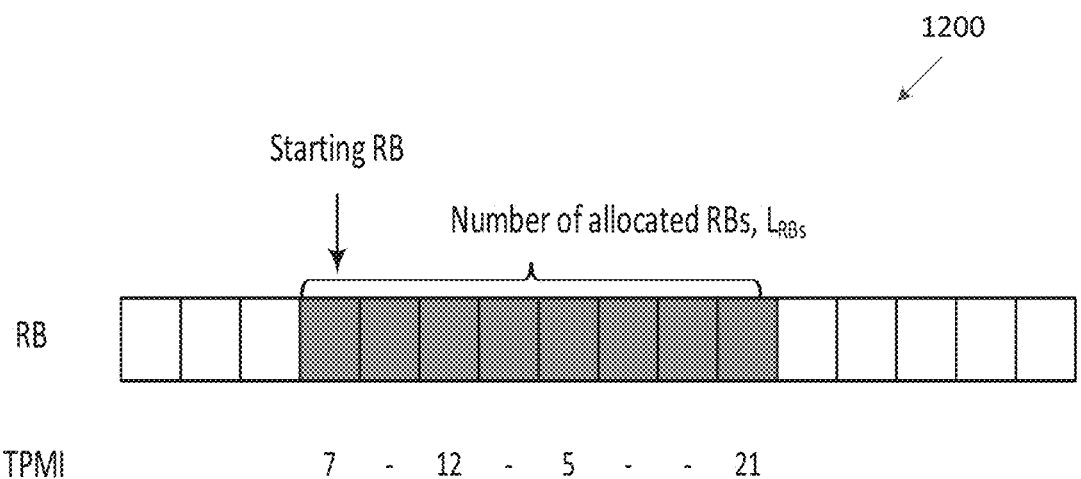
FIG. 12 illustrates another example of frequency-selective UL precoding for Type-1 resource allocation according to embodiments of the present disclosure.

FIG. 12 illustrates an example of frequency-selective UL precoding for Type-1 resource allocation 1200 according to embodiments of the present disclosure. The embodiment of the frequency-selective UL precoding for Type-1 resource allocation 1200 illustrated in FIG. 12 is for illustration only. FIG. 12 does not limit the scope of this disclosure to any particular implementation of the frequency-selective UL precoding for Type-1 resource allocation 1200.

In one example II.1.2, frequency selective UL precoding is indicated by a parameter to contain TPMI sequence (or TPMI tuple) comprising of multiple TPMI indices, wherein the number of elements in the TPMI sequence does not have to be the same as the number of the allocated RBs $L_{RBs}$.

In one example II.1.2.1, TPMI in the TPMI sequence is indicated only when the TPMI corresponding to the previous allocated RB is not the same as the TPMI corresponding to the current allocated RB. In one example, the RBs that are not having indicated TPMIs are regarded to have the same TPMIs that are indicated for the nearest RBs from their RBs among the previous allocated RBs. An example is shown in FIG. 12.

In one example, a bitmap indicator with size of the allocated RBs, $L_{RBS}$, is used to indicate whether TPMI index exists or not. In one example, 1 refers to TPMI index is included, and 0 refers to TPMI index is not included.

Figure 13:
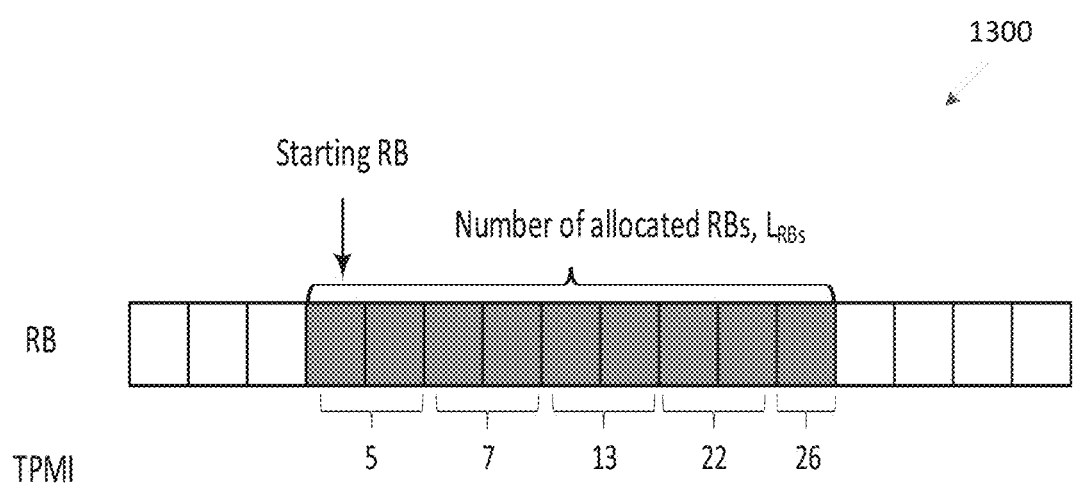
FIG. 13 illustrates yet another example of frequency-selective UL precoding for Type-1 resource allocation according to embodiments of the present disclosure.

FIG. 13 illustrates an example of frequency-selective UL precoding for Type-1 resource allocation 1300 according to embodiments of the present disclosure. The embodiment of the frequency-selective UL precoding for Type-1 resource allocation 1300 illustrated in FIG. 13 is for illustration only. FIG. 13 does not limit the scope of this disclosure to any particular implementation of the frequency-selective UL precoding for Type-1 resource allocation 1300.

In one embodiment II.2, the granularity of frequency selective UL precoding is UL subband (SB), defined as a set of contiguous RBs. In one example, the size of UL SB K in terms of RBs is fixed, determined in a predetermined rule, or configured. The size of UL SB doesn't have to be the same as the size of RBG as in Type-0 UL resource allocations. In one example, the size of UL SB can be {2, 4, 8, 16} RBs. In another example, the size of UL SB can be {1, 2, 3, 4} RBs. In another example, the size of UL SB can be {2, 4} RBs.

In one example II.2.1, frequency selective UL precoding is indicated by using a parameter to contain TPMI sequence (or TPMI tuple) comprising of multiple TPMI indices, wherein the number of elements in the TPMI sequence is the number of the allocated SBs, i.e., $$\left\lceil \frac{L_{RBs}}{K} \right\rceil.$$

An example is shown in FIG. 13 when K=2.

In one example, the mapping of each element in TPMI sequence to the allocated RBs for UL resource allocation is done in a way that the first TPMI index in the TPMI sequence corresponds to the RBs corresponding to the first SB, the second TPM index in the TPMI sequence corresponds to the RBs corresponding to the second SB, and so on.

In one example, the mapping of each element in TPMI sequence to the allocated RBs for UL resource allocation is done in a way that the first TPMI index in the TPMI sequence corresponds to the RBs corresponding to the last SB, the second TPM index in the TPMI sequence corresponds to the RBs corresponding to the second last SB, and so on.

In one example II.2.2, frequency selective UL precoding is indicated by a parameter to contain TPMI sequence (or TPMI tuple) comprising of multiple TPMI indices, wherein the number of elements in the TPMI sequence does not have to be the same as the number of the allocated SBs $$\left\lceil \frac{L_{RBs}}{K} \right\rceil.$$

Figure 14:
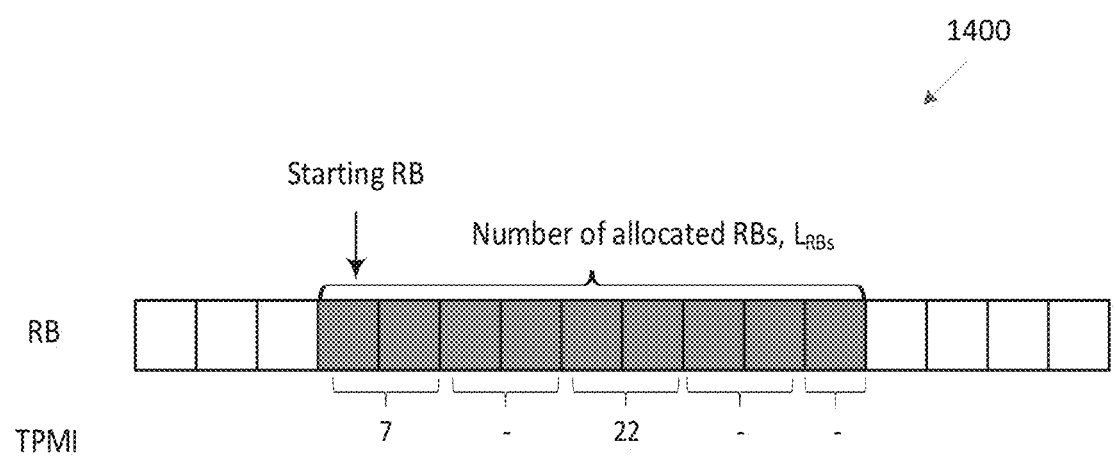
FIG. 14 illustrates still another example of frequency-selective UL precoding for Type-1 resource allocation according to embodiments of the present disclosure.

FIG. 14 illustrates an example of frequency-selective UL precoding for Type-1 resource allocation 1400 according to embodiments of the present disclosure. The embodiment of the frequency-selective UL precoding for Type-1 resource allocation 1400 illustrated in FIG. 14 is for illustration only. FIG. 14 does not limit the scope of this disclosure to any particular implementation of the frequency-selective UL precoding for Type-1 resource allocation 1400.

In one example II.2.2.1, TPMI in the TPMI sequence is indicated only when the TPMI corresponding to the previous allocated SB is not the same as the TPMI corresponding to the current allocated SB. In one example, the SBs that are not having indicated TPMIs are regarded to have the same TPMIs that are indicated for the nearest SBs from their SBs among the previous allocated SBs. An example is shown in FIG. 14.

In one example, a bitmap indicator with size of the allocated SBs, $$\left\lceil \frac{L_{RBs}}{K} \right\rceil,$$

is used to indicate whether TPMI index exists or not. In one example, 1 refers to TPMI index is included, and 0 refers to TPMI index is not included.

In one embodiment II.3, the total number of TPMI indices M to indicate for the allocated RBs is fixed, determined in a rule, or configured via DCI or higher-layer parameters. For example, M=2. In another example, M={1,2,3,4} and one of the values is configured via DCI or higher-layer parameters.

In one example II.3.1, a parameter to indicate which M RBs out of the $L_{RBS}$ allocated RBs are linked with M TPMI indices is used. In one example, M RBs can be indicated via a bitmap. In another example, a parameter having the cardinality of $$\binom{L_{RBs}}{M}$$

(i.e., $L_{RBS}$ choose M) can be used. In one example, the locations of M RBs are pre-determined or follow a pre-determined rule. In one example, the RBs that are not linked with the TPMIs are regarded to have the same TPMIs that are indicated for the nearest RBs from their RBs among the previous allocated RBs.

In one example II.3.2, a parameter to indicate which M SBs out of the $$\left\lceil \frac{L_{RBs}}{K} \right\rceil$$

allocated SBs are linked with M TPMI indices is used. In one example, M SBs can be indicated via a bitmap. In another example, a parameter having the cardinality of $$\binom{\left\lceil \frac{L_{RBs}}{K} \right\rceil}{M}$$

(i.e., $$\left\lceil \frac{L_{RBs}}{K} \right\rceil$$

choose M) can be used. The locations of M SBs are pre-determined or follow a pre-determined rule. In one example, the SBs that are not linked with the TPMIs are regarded to have the same TPMIs that are indicated for the nearest SBs from their SBs among the previous allocated SBs.

In one embodiment III, a UE is configured or indicated to use frequency selective UL precoding for the allocated resource blocks using other UL resource allocation for G contiguous RB sets. DCI, MAC-CE, or high layer parameters can be used to configure/indicate UE to use frequency selective UL precoding.

In one embodiment III.1, the granularity of frequency selective UL precoding is RB.

In one example III. 1.1, frequency selective UL precoding is indicated by using a parameter to contain TPMI sequence (or TPMI tuple) comprising of multiple TPMI indices, wherein the number of elements in the TPMI sequence is the number of the allocated RBs, i.e., $\Sigma_{g=1}^{G} L_{RBs,g}$, where $L_{RBS,g}$ is the length of the allocated RBs in contiguous RB set g.

In one example, the mapping of each element in TPMI sequence to the allocated RBs for UL resource allocation is done in a way that the first TPMI index in the TPMI sequence corresponds to the starting (first) RB of the contiguous RB set having the lowest RB number, the second TPM index in the TPMI sequence corresponds to the second RB of the contiguous RB set having the lowest RB number, . . . and so on.

In one example, the mapping of each element in TPMI sequence to the allocated RBs for UL resource allocation is done in a way that the first TPMI index in the TPMI sequence corresponds to the last RB of the contiguous RB set having the highest RB number, the second TPM index in the TPMI sequence corresponds to the second last RB of the contiguous RB set having the highest RB number, . . . and so on.

In one example III. 1.2, frequency selective UL precoding is indicated by a parameter to contain TPMI sequence (or TPMI tuple) comprising of multiple TPMI indices, wherein the number of elements in the TPMI sequence does not have to be the same as the number of the allocated RBs $\Sigma_{g=1}^{G} L_{RBs,g}$ In one example III.1.2.1, TPMI in the TPMI sequence is indicated only when the TPMI corresponding to the previous allocated RB is not the same as the TPMI corresponding to the current allocated RB. In one example, the RBs that are not having indicated TPMIs are regarded to have the same TPMIs that are indicated for the nearest RBs from their RBs among the previous allocated RBs.

In one example, a bitmap indicator with size of the allocated RBs, $\Sigma_{g=1}^{G} L_{RBs,g}$, is used to indicate whether TPMI index exists or not. In one example, 1 refers to TPMI index is included, and 0 refers to TPMI index is not included.

In one embodiment III.2, the granularity of frequency selective UL precoding is UL subband (SB), defined as a set of contiguous RBs. In one example, the size of UL SB K in terms of RBs is fixed, determined in a predetermined rule, or configured. The size of UL SB doesn't have to be the same as the size of RBG as in Type-0 UL resource allocations. In one example, the size of UL SB can be {2, 4, 8, 16} RBs. In another example, the size of UL SB can be {1, 2, 3, 4} RBs. In another example, the size of UL SB can be {2, 4} RBs.

In one example III.2.1, frequency selective UL precoding is indicated by using a parameter to contain TPMI sequence (or TPMI tuple) comprising of multiple TPMI indices, wherein the number of elements in the TPMI sequence is the number of the allocated SBs, i.e., $$\Sigma_g \left\lceil \frac{L_{RBs,g}}{K} \right\rceil.$$

In one example, the mapping of each element in TPMI sequence to the allocated RBs for UL resource allocation is done in a way that the first TPMI index in the TPMI sequence corresponds to the RBs corresponding to the first SB of the contiguous RB set having the lowest RB number, the second TPM index in the TPMI sequence corresponds to the RBs corresponding to the second SB of the contiguous RB set having the lowest RB number, . . . and so on.

In one example, the mapping of each element in TPMI sequence to the allocated RBs for UL resource allocation is done in a way that the first TPMI index in the TPMI sequence corresponds to the RBs corresponding to the last SB of the contiguous RB set having the highest RB number, the second TPM index in the TPMI sequence corresponds to the RB s corresponding to the second last SB of the contiguous RB set having the highest RB number, . . . and so on.

In one example III.2.2, frequency selective UL precoding is indicated by a parameter to contain TPMI sequence (or TPMI tuple) comprising of multiple TPMI indices, wherein the number of elements in the TPMI sequence does not have to be the same as the number of the allocated $$SBs \Sigma_g \left\lceil \frac{L_{RBs,g}}{K} \right\rceil.$$

In one example III. 2.2.1, TPMI in the TPMI sequence is indicated only when the TPMI corresponding to the previous allocated SB is not the same as the TPMI corresponding to the current allocated SB. In one example, the SB s that are not having indicated TPMIs are regarded to have the same TPMIs that are indicated for the nearest SBs from their SBs among the previous allocated SBs.

In one example, a bitmap indicator with size of the allocated SBs, $$\Sigma_g \left\lceil \frac{L_{RBs,g}}{K} \right\rceil,$$

is used to indicate whether TPMI index exists or not. In one example, 1 refers to TPMI index is included, and 0 refers to TPMI index is not included.

In one embodiment III.3, the total number of TPMI indices M to indicate for the allocated RBs is fixed, determined in a rule, or configured via DCI or higher-layer parameters. For example, M=2. In another example, M={1, 2,3,4} and one of the values is configured via DCI or higher-layer parameters.

In one example III.3.1, M=G, i.e., each contiguous RB set has a corresponding TPMI. In one example, the order of mapping from TPMI sequence to contiguous RB sets is pre-determined.

In one example III.3.2, M≤G. In one example, a bitmap indicator is used to indicate whether TPMI index exists or not. In one example, 1 refers to TPMI index is included, and 0 refers to TPMI index is not included. In one example, TPMI in the TPMI sequence is indicated only when the TPMI corresponding to the previous allocated RB set is not the same as the TPMI corresponding to the current allocated RB set. In one example, the RB sets that are not having indicated TPMIs are regarded to have the same TPMIs that are indicated for the nearest RB sets from their RB sets among the previous allocated RB sets.

In one example III.3.3, M≥G. In one example, M=$\Sigma_g M_g$, where $M_g$ is for contiguous RB set g.

In one example III3.3.1, a parameter to indicate which $M_g$ RBs out of the $L_{RBs,g}$ allocated RBs are linked with $M_g$ TPMI indices is used. In one example, $M_g$ RBs can be indicated via a bitmap. In another example, a parameter having the cardinality of $$\binom{L_{RBs,g}}{M_g}$$

(i.e., $L_{RBs,g}$ choose $M_g$) can be used. In one example, the locations of $M_g$ RBs are pre-determined or follow a pre-determined rule. In one example, the RBs that are not linked with the TPMIs are regarded to have the same TPMIs that are indicated for the nearest RBs from their RBs among the previous allocated RBs. In one example, $M_1=M_2=\ldots=M_G$. In one example, $M_g=M_{g'}$ for $g \neq g'$.

In one example III.3.3.2, a parameter to indicate which $M_g$ SBs out of the $$\left\lceil \frac{L_{RBs,g}}{K} \right\rceil$$

allocated SBs are linked with $M_g$ TPMI indices is used. In one example, $M_g$ SBs can be indicated via a bitmap. In another example, a parameter having the cardinality of $$\binom{\left\lceil \frac{L_{RBs,g}}{K} \right\rceil}{M_g}$$

(i.e., $$\left\lceil \frac{L_{RBs,g}}{K} \right\rceil$$

choose $M_g$) can be used. The locations of $M_g$ SBs are pre-determined or follow a pre-determined rule. In one example, the SBs that are not linked with the TPMIs are regarded to have the same TPMIs that are indicated for the nearest SBs from their SBs among the previous allocated SBs.

Figure 15:
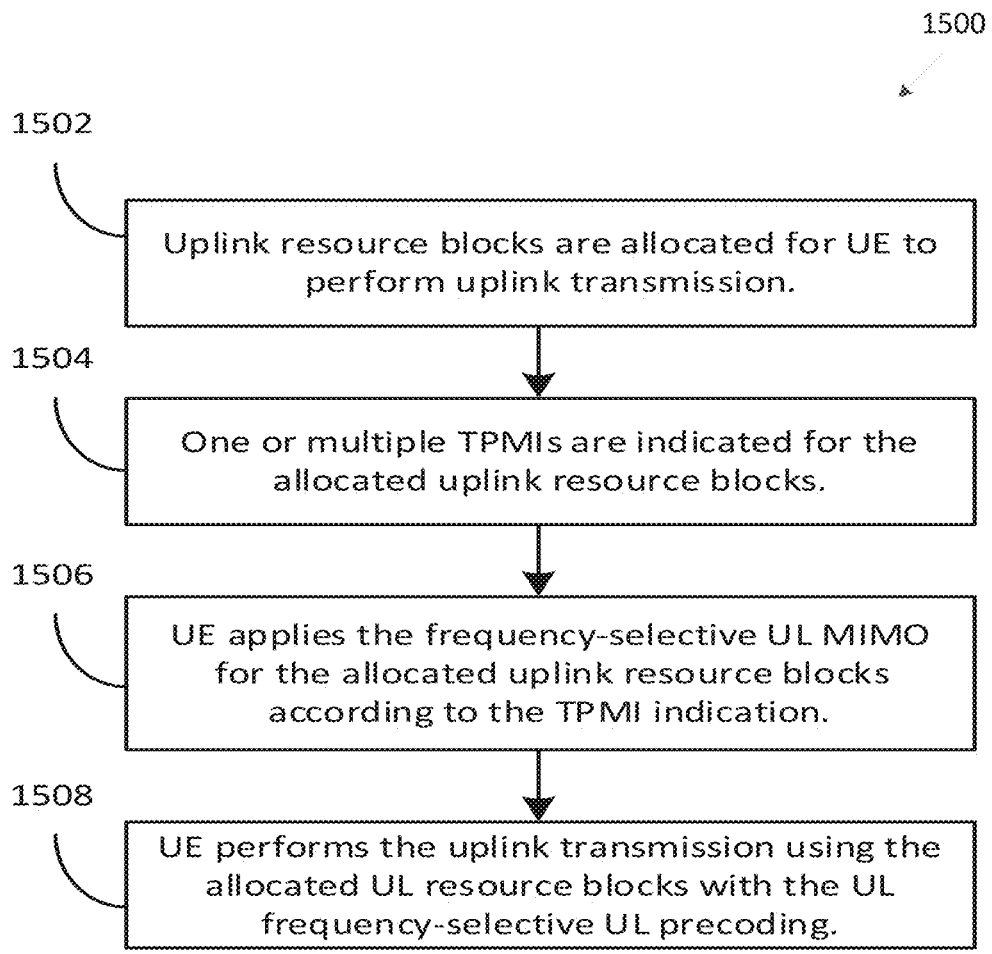
FIG. 15 illustrates a flow diagram for a frequency selective UL precoding procedure according to embodiments of the present disclosure.

FIG. 15 illustrates a flow diagram for a frequency selective UL precoding procedure 1500 according to embodiments of the present disclosure. The embodiment of the flow diagram for a frequency selective UL precoding procedure 1500 illustrated in FIG. 15 is for illustration only. FIG. 15 does not limit the scope of this disclosure to any particular implementation of the flow diagram for a frequency selective UL precoding procedure 1500.

FIG. 15 illustrates an overall flow chart for a frequency selective UL precoding procedure that can use the components I/II/III. Through the multiple TPMI indication mechanisms provided in component I/II/III, frequency selective UL precoding can be indicated/applied to the UE and the UE can perform uplink transmission using the allocated resource blocks with the frequency selective UL precoding.

Linear combination (LC) codebook is useful to compress channel coefficients using basis matrices and has been adopted in NR for DL CSI feedback under the name of Type-II CSI. On the other hand, UL precoding has been only allowed to be selected from a confined set of precoding matrices under the TPMI framework.

Similar to DL SB concept, a UL SB can be defined as a set of contiguous RBs. In one example, the size of a UL SB is the same as the number of RBs in a RB G. In another example, UL SB is defined as multiples of RBG. This disclosure considers UL SB as a granularity for UL precoding in frequency domain and provides components for LC codebook-based UL precoding indication.

This disclosure introduces several components to support high resolution UL precoding, using a LC codebook approach. This disclosure provides first a general way of high-resolution UL precoding via LC codebook, which can be applicable to a UE having the full-coherent capability across antenna ports, and then introduces an extension of high-resolution UL precoding for multiple antenna port groups, which can be applicable to a UE having multiple coherent antenna port groups wherein antenna ports within a group are able to perform coherent precoding but antenna ports associated with different groups are not able to perform coherent precoding, which is called 'partial coherency'.

Figure 16:
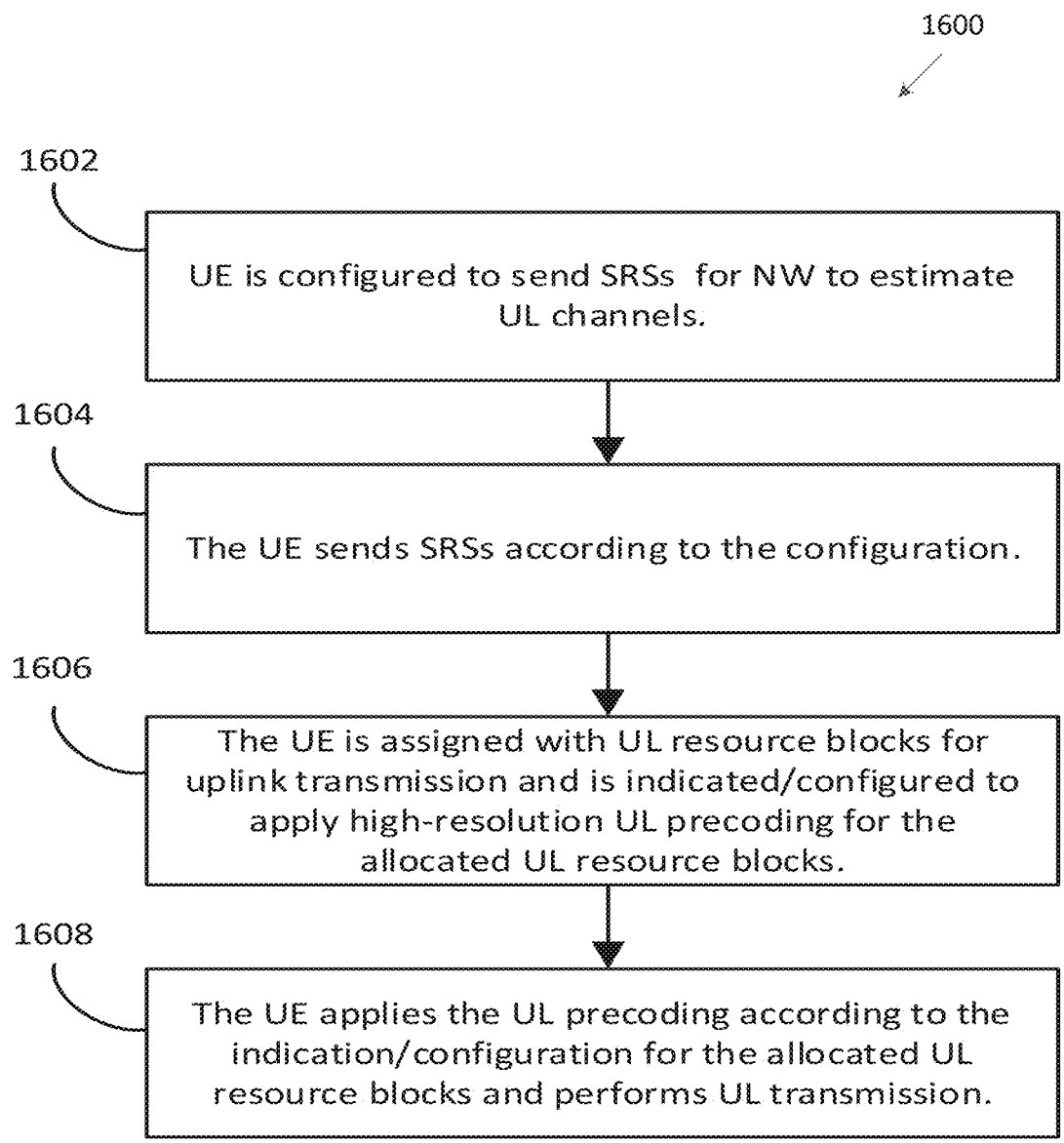
FIG. 16 illustrates a flow diagram of UE operations for high-resolution UL processing according to embodiments of the present disclosure.
Figure 17:
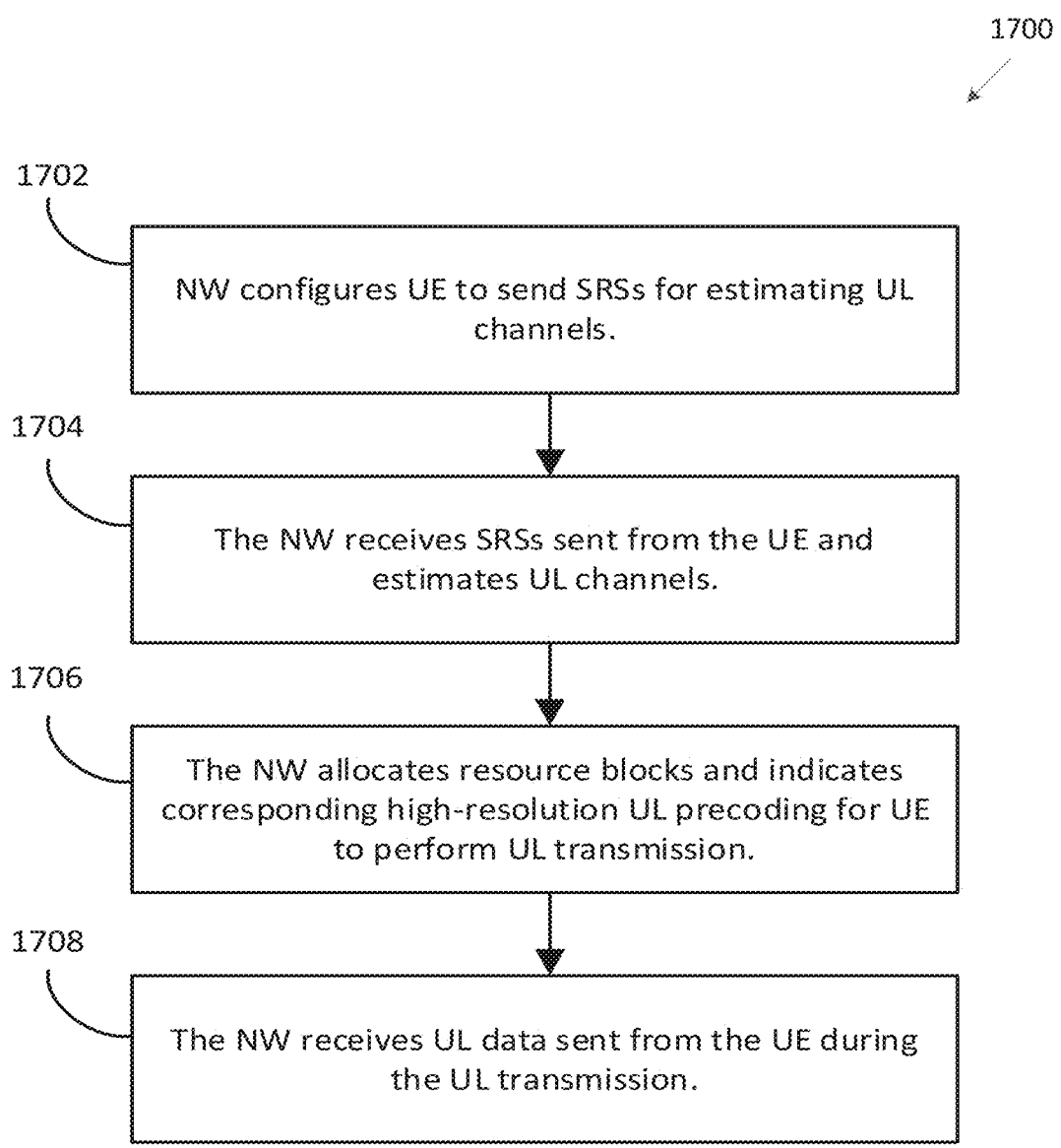
FIG. 17 illustrates a flow diagram of NW operations for high-resolution UL processing according to embodiments of the present disclosure.

Representative flow charts of UE and NW operations for high-resolution UL precoding are described in FIG. 16 and FIG. 17, respectively. This disclosure mainly introduces components to indicate high resolution UL precoding, which are primarily relevant to operations 1606 and 1706.

FIG. 16 illustrates a flow diagram of UE operations for high-resolution UL processing 1600 according to embodiments of the present disclosure. The embodiment of the flow diagram of UE operations for high-resolution UL processing 1600 illustrated in FIG. 16 is for illustration only. FIG. 16 does not limit the scope of this disclosure to any particular implementation of the flow diagram of UE operations for high-resolution UL processing 1600.

At step 1602, the UE is configured to send SRSs for NW to estimate UL channels.

At step 1604, the UE sends SRSs according to the configuration.

At step 1606, the UE is assigned with UL resource blocks for uplink transmission and is indicated/configured to apply high-resolution UL precoding for the allocated UL resource blocks.

At step 1608, the UE applies the UL precoding according to the indication/configuration for the allocated UL resource blocks and performs UL transmission.

FIG. 17 illustrates a flow diagram of NW operations for high-resolution UL processing 1700 according to embodiments of the present disclosure. The embodiment of the flow diagram of NW operations for high-resolution UL processing 1700 illustrated in FIG. 17 is for illustration only. FIG. 17 does not limit the scope of this disclosure to any particular implementation of the flow diagram of NW operations for high-resolution UL processing 1700.

At step 1702, the NW configures the UE to send SRSs for estimating UL channels.

At step 1704, the NW receives SRSs sent from the UE and estimates UL channels.

At step 1706, the NW allocates resource blocks and indicates corresponding high-resolution UL precoding for UE to perform UL transmission.

At step 1708, the NW receives UL data sent from the UE during the UL transmission.

In one embodiment IV.1, the UE is indicated via DCI/MAC-CE or higher-layer parameter to apply for UL precoding for UL transmission, which can be expressed as (for a given layer):

$$V = V_b V_c V_f^H \tag{1}$$

where $V_b$ is an N×L(≤N) spatial domain (SD) basis matrix, $V_f$ is a K×M(≤K) frequency domain (FD) basis matrix, and $V_c$ is an L×M coefficient matrix corresponding to SD/FD beam pairs. Here, N is the number of antenna ports at UE, K is the number of UL SBs for allocated resource blocks, and L and M are the number of basis vectors for the SD and FD basis matrices, respectively.

In one embodiment IV.2, the SD basis matrix $V_b$ is selected from a set of oversampled DFT vectors and indicated to the UE. In one example, for a given N and oversampled factor $O_1$, a DFT vector $b_i$ can be expressed as $$b_i = \frac{1}{\sqrt{N}}\left[1 \quad e^{j\frac{2\pi i}{O_1 N}} \quad \ldots \quad e^{j\frac{2\pi i(N-1)}{O_1 N}}\right]^T,$$

where $i \in \{0,1,\ldots,O_1N-1\}$. In one example, $O_1=1$. In one example, $O_1>1$ and the value is either fixed (e.g., to 4) or configured (e.g., via RRC).

In one example, $N=aN_1N_2$, where $N_1$ and $N_2$ respectively are numbers of antenna ports in first and second dimensions, respectively, and a=1 when the antenna ports are co-polarized (or single polarized), and a=2 when the antenna ports are dual-polarized.

In one example, the set of candidate values for N include {2,4} or {4} or {4,8} or {2,4,8} or {8} or {2,4,8,16} or {4,8,16}.

In one embodiment IV.3, the FD basis matrix $V_f$ is selected from a set of oversampled DFT vectors and indicated to the UE. In one example, for a given K and oversampled factor $O_2$, a DFT vector $f_i$ can be expressed as $$f_i = \frac{1}{\sqrt{K}}\left[1 \quad e^{j\frac{2\pi i}{O_2 K}} \quad \ldots \quad e^{j\frac{2\pi i(K-1)}{O_2 K}}\right]^T,$$

where $i \in \{0,1,\ldots,O_2K-1\}$. In one example, $O_2=1$. In one example, $O_2>1$ and the value is either fixed (e.g., to 4) or configured (e.g., via RRC).

In one embodiment IV.4, elements of $V_c$ are decomposed into amplitude and phase values, and they are selected from different quantized codebooks and indicated to the UE.

In one example IV.4.1, a bitmap is used to indicate the location (or indices) of the non-zero (NZ) coefficients of the $V_c$ matrix. The amplitude/phase of the NZ coefficients are indicated, and that of the remaining coefficients are not indicated, and the remaining coefficients values are set to 0.

In one example IV.4.2, a strongest coefficient indicator (SCI) is used to indicate the location (or index) of the strongest coefficient of the $V_c$ matrix. The amplitude and phase of the strongest coefficient are set to a fixed value, e.g., 1, and are hence not indicated.

In one example IV.4.3, amplitude and phase of the non-zero coefficients of the $V_c$ matrix are indicated to the UE using respective codebooks. In one example, the phase codebook is fixed, e.g., QPSK or 8PSK or 16PSK. In one example, the phase codebook is configured, e.g., from QPSK (2-bit), 8PSK (3-bit per phase) and 16PSK (4-bit per phase). In one example, amplitudes are selected from a codebook having equidistant points in [0, X] in dB scale, e.g., X=1.

In one embodiment IV.5, $V_b$=I, an identity matrix, i.e., there is no SD basis matrix and no SD compression. In this case, (1) can be reduced to $V=V_cV_f^H$.

In one embodiment IV.6, $V_f$=I, i.e., there is no FD basis matrix and no FD compression. In this case, (1) can be reduced to $V=V_bV_c$.

In one embodiment IV.7, $V_b$=I and $V_f$=I, i.e., there are no FD/SD bases matrices and no SD/FD compression. In this case, (1) can be reduced to $V=V_c$.

Figure 18:
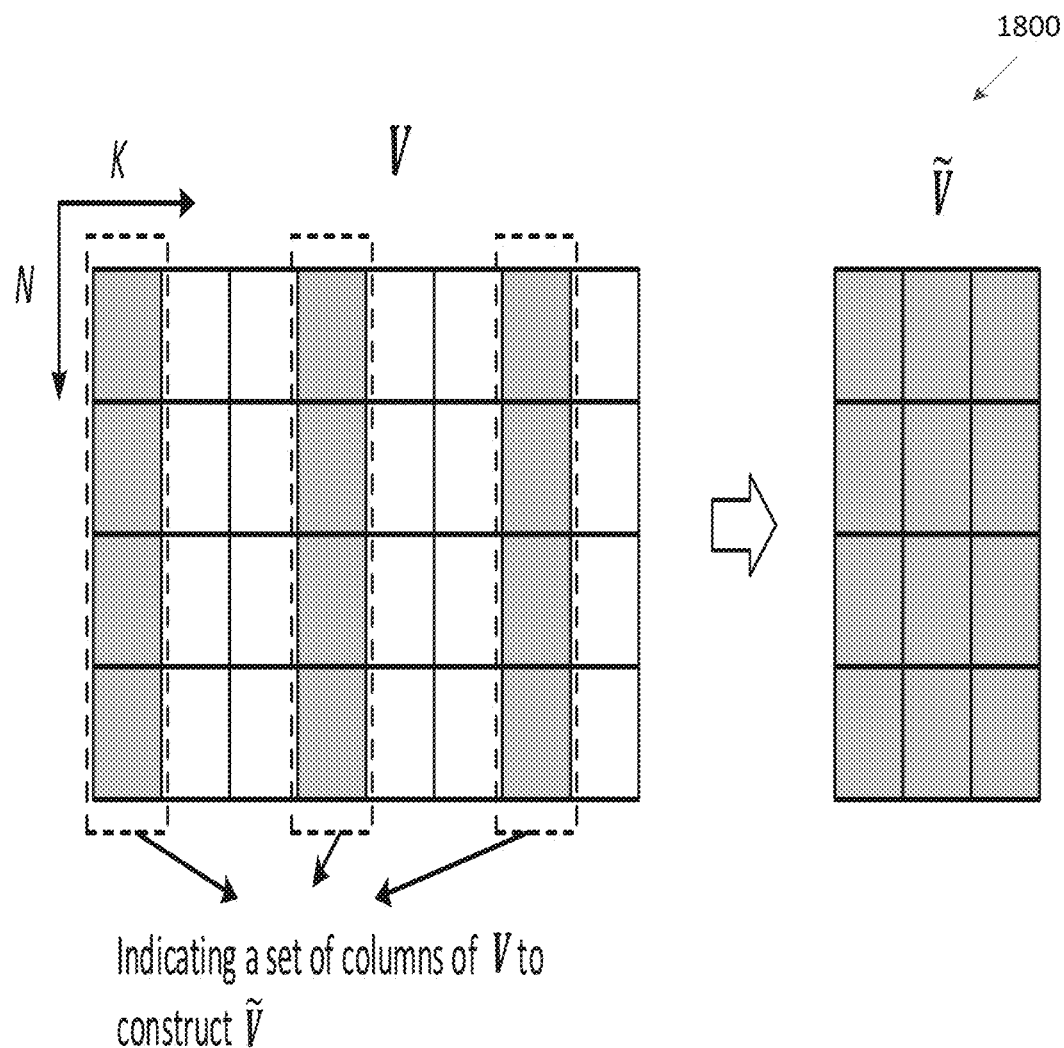
FIG. 18 illustrates an example of indicating a set of columns of V to construct V according to embodiments of the present disclosure.

FIG. 18 illustrates an example of indicating a set of columns of V to construct V 1800 according to embodiments of the present disclosure. The embodiment of the example of indicating a set of columns of V to construct $\tilde{V}$ 1800 illustrated in FIG. 18 is for illustration only. FIG. 18 does not limit the scope of this disclosure to any particular implementation of the example of indicating a set of columns of V to construct $\tilde{V}$ 1800.

In one embodiment IV.8, a sub-matrix of V, which is denoted by $\tilde{V}$, is indicated for UE to apply for UL precoding, which can be expressed as (similar to (1)):

$$\tilde{V}=V_bV_cV_f^H,$$

where the components of $V_b$, $V_c$, and $V_f$ are designed as described in embodiments IV.1/IV.2/IV.3/IV.4/IV.5/IV.6/IV.7. In this embodiment, instead of indicating on a whole matrix V (i.e., UL precoding information for all antenna ports and UL SBs), information on a submatrix V needs to be indicated to the UE.

In one example IV.8.1, a parameter is used to indicate which elements of V are used to construct a submatrix $\tilde{V}$.

In one example IV.8.1.1, a parameter is used to indicate a set of columns of V (i.e., a subset of UL SB resources) to construct a submatrix $\tilde{V}$. An example is shown in FIG. 18.

In one example, a bitmap indicator is used to indicate A columns out of K columns of V to construct a submatrix $\tilde{V}$.

In one example, an index indicator is used to indicate A columns among K columns of V to construct a submatrix $\tilde{V}$.

In one example, the number of columns A to be indicated is fixed or determined in a pre-determined rule. In another example, A ∈ {1,2,3,4} and one of them is selected by NW.

In one example, for each of the columns that are not indicated by a parameter, the same UL precoding corresponding to the nearest column (from left or right) that is indicated by the parameter is applied.

In one example, a pre-determined rule is applied for UL precoding corresponding to each of the columns that are not indicated by a parameter. In one example, the UL precoding that has been used from the previous time for the resource is applied. In another example, UE does not apply any precoder for the columns that are not indicated by a parameter.

Figure 19:
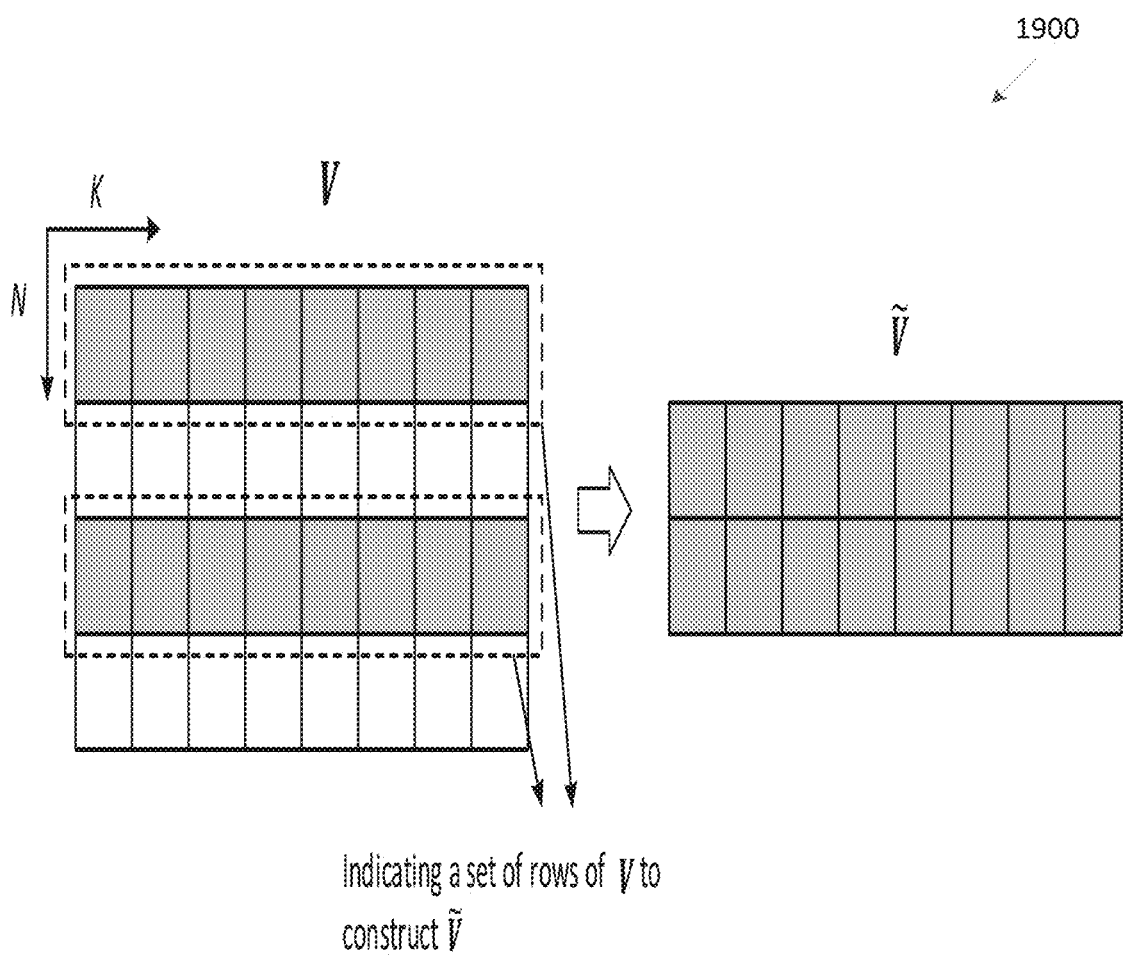
FIG. 19 illustrates an example of indicating a set of rows of V to construct V according to embodiments of the present disclosure.

FIG. 19 illustrates an example of indicating a set of rows of V to construct V 1900 according to embodiments of the present disclosure. The embodiment of the example of indicating a set of rows of V to construct V 1900 illustrated in FIG. 19 is for illustration only. FIG. 19 does not limit the scope of this disclosure to any particular implementation of the example of indicating a set of rows of V to construct V 1900.

In one example IV.8.1.2, a parameter is used to indicate a set of rows of V (i.e., a subset of UL antenna ports) to construct a submatrix $\tilde{V}$. An example is shown in FIG. 19.

In one example, a bitmap indicator is used to indicate B rows out of N rows of V to construct a submatrix $\tilde{V}$.

In one example, an index indicator is used to indicate B rows among N rows of V to construct a submatrix $\tilde{V}$.

In one example, the number of rows B to be indicated is fixed or determined in a pre-determined rule. In another example, B ∈ {1,2,3,4} and one of them is selected by NW.

In one example, for each of the rows that are not indicated by a parameter, the same UL precoding corresponding to the nearest row (from above or below) that is indicated by the parameter is applied.

In one example, for each of the rows that are not indicated by a parameter, a modified version of the UL precoding corresponding to the nearest row (from above or below) that is indicated by the parameter is applied. For example, a phase shift value is additionally multiplied.

In one example, a pre-determined rule is applied for UL precoding corresponding to each of the rows that are not indicated by a parameter. In one example, the UL precoding that has been used from the previous time for the resource is applied. In another example, UE does not apply any precoder for the columns that are not indicated by a parameter.

Figure 20:
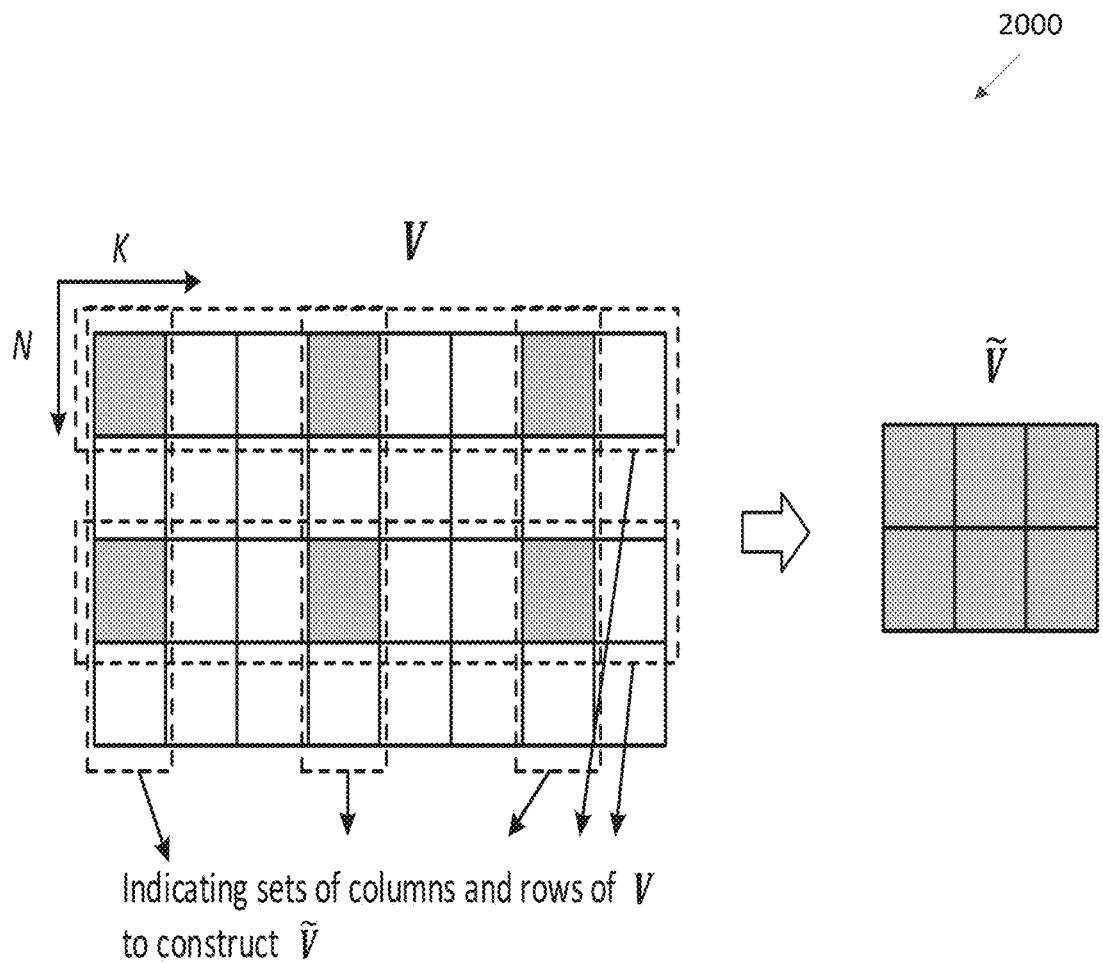
FIG. 20 illustrates an example of indicating a set of columns and rows of V to construct V according to embodiments of the present disclosure.

FIG. 20 illustrates an example of indicating a set of columns and rows of V to construct $\tilde{V}$ 2000 according to embodiments of the present disclosure. The embodiment of the example of indicating a set of columns and rows of V to construct $\tilde{V}$ 2000 illustrated in FIG. 20 is for illustration only. FIG. 20 does not limit the scope of this disclosure to any particular implementation of the example of indicating a set of columns and rows of V to construct $\tilde{V}$ 2000.

In one example IV.8.1.3, a parameter(s) is used to indicate sets of columns and rows of V to construct a submatrix $\tilde{V}$. An example is shown in FIG. 20.

In one example, a bitmap indicator(s) is used to indicate A columns out of K columns and B rows out of N rows of V to construct a submatrix $\tilde{V}$.

In one example, an index indicator(s) is used to indicate A columns out of K columns and B rows out of N rows of V to construct a submatrix $\tilde{V}$.

In one example, the numbers of columns A and rows B to be indicated are fixed or determined in a pre-determined rule. In another example, A, B ∈ {1,2,3,4} and one of them for each of A and B is selected by NW.

In one example, for each of the columns that are not indicated by a parameter, the same UL precoding corresponding to the nearest column (from left or right) that is indicated by the parameter is applied.

In one example, a pre-determined rule is applied for UL precoding corresponding to each of the columns that are not indicated by a parameter. In one example, the UL precoding that has been used from the previous time for the resource is applied. In another example, UE does not apply any precoder for the columns that are not indicated by a parameter.

In one example, for each of the rows that are not indicated by a parameter, the same UL precoding corresponding to the nearest row (from above or below) that is indicated by the parameter is applied.

In one example, for each of the rows that are not indicated by a parameter, a modified version of the UL precoding corresponding to the nearest row (from above or below) that is indicated by the parameter is applied. For example, a phase shift value is additionally multiplied.

In one example, a pre-determined rule is applied for UL precoding corresponding to each of the rows that are not indicated by a parameter. In one example, the UL precoding that has been used from the previous time for the resource is applied. In another example, UE does not apply any precoder for the columns that are not indicated by a parameter.

In one example IV.8.2, one or multiple ways to construct a submatrix $\tilde{V}$ from V are pre-determined, and a parameter is used to indicate one of them for UE to understand on how it was constructed.

In one example IV.8.3, the elements of V used to construct a submatrix $\tilde{V}$ are fixed. In one example, row and column indices of V that construct a submatrix $\tilde{V}$ are fixed. In one example, row indices of V that construct a submatrix $\tilde{V}$ are fixed, and column indices are indicated (cf. example IV.8.1.1). In one example, column indices of V that construct the submatrix $\tilde{V}$ are fixed, and row indices are indicated (cf. example IV.8.1.2).

In one example IV.8.4, when the submatrix $\tilde{V}$ has fewer rows than V, then $V_b$ comprises column vectors $\tilde{b}_i$ of size $\tilde{N} \times 1$, where $\tilde{N} < N$ is the number of rows of a submatrix $\tilde{V}$. Likewise, when the submatrix $\tilde{V}$ has fewer columns than V, then $V_f$ comprises column vectors $\tilde{f}_i$ of size $\tilde{K} \times 1$, where $\tilde{K} < K$ is the number of columns of the submatrix $\tilde{V}$.

In one embodiment IV.9, column vectors of $V_c$ are indicated in a differential manner.

In one example IV.9.1, the first column of $V_c$ is determined using phase and amplitude codebooks as we have introduced for the codebooks, but each of the remaining columns (i.e., from the second to the last column) is determined via $v_{c,i} = v_{c,i-1} + \Delta v_{c,i}$, where $v_{c,i}$ and $\Delta v_{c,i}$ are the i-th column of $V_c$ and the differential vector for obtaining the i-th column of $V_c$. Thus, for each column (except the first column), indicating $\Delta v_{c,i}$ is only needed for UE to construct $v_{c,i}$.

In one example IV.9.2, each element of $\Delta v_{c,i}$ is decomposed into phase and amplitude, and they are selected from respective codebooks that can be different from the codebooks for $v_{c,i}$. In one example, the phase codebook is fixed, e.g., 16PSK. In one example, the phase codebook is configured, e.g., from 8PSK (3-bit per phase) and 16PSK (4-bit per phase). In one example, amplitudes are selected from a codebook having equidistant points in [0, Y] in dB scale, Y≤X. For example, Y=0.5 and X=1, which means that the amplitude codebook for $\theta v_{c,i}$ has more confined range than the amplitude codebook for $v_{c,i}$. Note that for the same number of points in codebooks for $\Delta v_{c,i}$ and $v_{c,i}$, the codebook for $\Delta v_{c,i}$ has a finer granularity than that of $v_{c,i}$.

Figure 21:
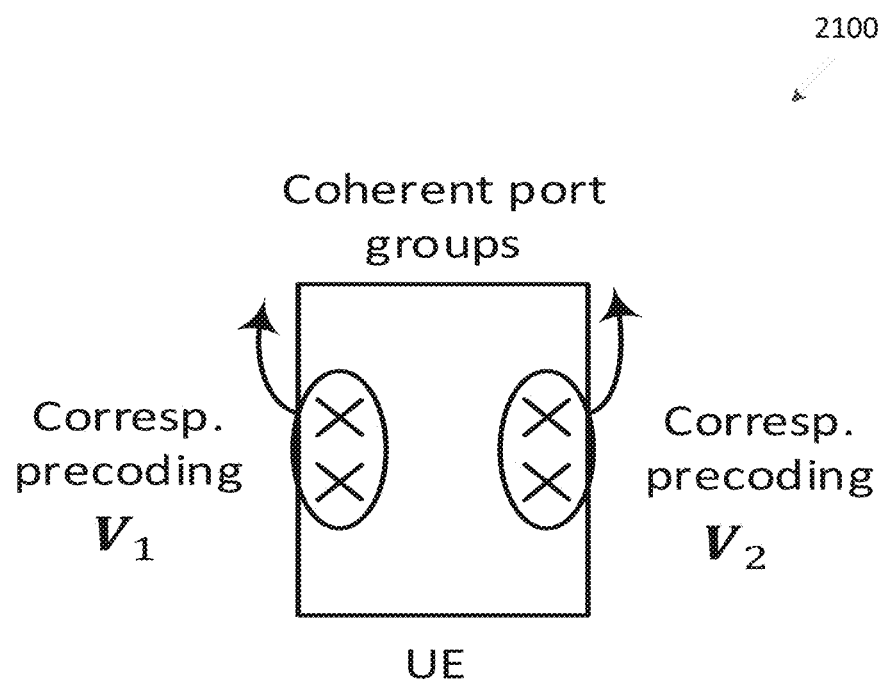
FIG. 21 illustrates an example of a UE having multiple coherent port groups according to embodiments of the present disclosure.

FIG. 21 illustrates an example of a UE having multiple coherent port groups 2100 according to embodiments of the present disclosure. The embodiment of the example of a UE having multiple coherent port groups 2100 illustrated in FIG. 21 is for illustration only. FIG. 21 does not limit the scope of this disclosure to any particular implementation of the example of a UE having multiple coherent port groups 2100.

In one embodiment V.1, the UL precoding matrix V is decomposed into $V = [V_1^T, \ldots, V_G^T]^T$, where $V_g$ is an $N_g \times K$ submatrix and $N = E_g N_g$. A submatrix $\tilde{V}_g$ can be expressed as:

$$V_g = V_{b,g} V_{c,g} V_{f,g}^H,$$

where $V_{b,g}$ is an $N_g \times L_g (\leq N_g)$ spatial domain (SD) basis matrix, $V_{f,g}$ is a $K \times M (\leq K)$ frequency domain (FD) basis matrix, and $V_{c,g}$ is an $L_g \times M$ coefficient matrix corresponding to SD/FD beam pairs. Here, $N_g$ is the number of antenna ports for group g at UE, K is the number of UL SBs for allocated resource blocks, and $L_g$ and M are the number of basis vectors for the SD and FD basis matrices, respectively.

In one example, $\{N_g\}$ are the same for all g=1, ..., G, e.g., $$N_g = \frac{N}{G}$$

for all g=1, . . . , G. In one example, {$L_g$} are the same for all g=1, . . . , G, e.g., $L_g$=L for all g=1, . . . , G. In one example, $N_g$=2 for g=1,2 and N=4 for two groups.

In one example, depending on UE capability, G and $N_g$ are determined and reported by UE for NW to understand on how UL precoding should be constructed for the UE. In one example, UE has antenna port groups wherein antenna ports within a group are able to perform coherent precoding, but antenna ports associated with different groups are not able to perform coherent precoding. In this case, UE reports information on antenna port groups, e.g., G and $N_g$. FIG. 21 shows an example of UE having multiple coherent port groups.

In one example, V=$[V_1^T, \ldots , V_G^T]^T$ is designed and indicated for each layer (i.e., stream). In another example, $V_g$ is regarded as UL precoding for stream g.

In embodiments, embodiments IV.1-IV.9 are applied with replacing V by $V_g$ for each group g.

In one example, SD basis matrices {$V_{b,g}$} are the same for all g=1, . . . , G, and thus one of {$V_{b,g}$} is indicated.

In one example, FD basis matrices {$V_{f,g}$} are the same for all g=1, . . . , G and thus one of {$V_{f,g}$} is indicated.

In one example, coefficient matrices {$V_{c,g}$} are the same for all g=1, . . . , G and thus one of {$V_{c,g}$} is indicated.

In one embodiment V.2, {$V_{c,g}$} have a relationship and a parameter(s) is defined to represent the relationship to indicate the coefficient matrices {$V_{c,g}$}.

In one embodiment V.2.1, for $L_g$=L, ∀g, coefficient matrices {$V_{c,g}$} are expressed as $V_{c,g}=\overline{V}_c\Lambda_g$, where $\overline{V}_c$ is an L×M representative coefficient matrix and $\Lambda_g$ is an M×M diagonal matrix. $\overline{V}_c$ and {$\Lambda_g$} are indicated for UE to construct {$V_{c,g}$}.

In one example V.2.1.1, the representative coefficient matrix $\overline{V}_c$ is determined as one of {$V_{c,g}$} and thus for the representative group g, $\Lambda_g$ is not indicated and $\overline{V}_c$ is only indicated for $V_{c,g}$. In this case, for g'≠g, $\Lambda_{g'}$ is only indicated since $V_{c,g'}=V_{c,g}\Lambda_{g'}$.

In one example, the group index corresponding to the representative coefficient matrix is configured. In another example, the group index corresponding to the representative coefficient matrix is fixed or pre-determined, e.g., $\overline{V}_c=V_{c,1}$ in the case that the representative group equals to 1.

In one example V.2.1.2, each diagonal element of $\Lambda_g$ is selected from a phase codebook. In one example, a phase codebook is fixed, e.g., 8PSK (3-bit). In another example, a phase codebook is configured by NW. For example, 8PSK or 16PSK is selected and indicated by NW.

In one example V.2.1.3, each diagonal element of $\Lambda_g$ is decomposed into amplitude and phase, and they are selected from respective codebooks. In one example, a phase codebook is fixed, e.g., 8PSK (3-bit). In another example, a phase codebook is configured by NW. For example, 8PSK or 16PSK is selected and indicated by NW. In one example, an amplitude codebook is fixed, e.g., a codebook having equidistant points in [0,1] in dB scale.

In one example, all of the diagonal elements of $\Lambda_g$ are the same, i.e., $V_{c,g}=\overline{V}_c\Lambda_g=a_g\overline{V}_c$. In this case, NW indicates $a_g$ only for $\Lambda_g$.

In one example, all of the diagonal elements of $\Lambda_g$ are the same, and $a_g$=1. In this case, NW does not have to indicate anything for $\Lambda_g$.

In one embodiment V.2.2, for $L_g$=L, ∀g, coefficient matrices {$V_{c,g}$} are expressed as $V_{c,g}=\overline{V}_c+\Delta V_g$, where $\overline{V}_c$ is an L×M representative coefficient matrix and $\Delta V_g$ is an L×M matrix. $\overline{V}_c$ and {$\Delta V_g$} are indicated for UE to construct {$V_{c,g}$}.

In one example V.2.2.1, the representative coefficient matrix $\overline{V}_c$ is determined as one of {$V_{c,g}$} and thus for the representative group g, $\Delta V_g$ is not indicated and $\overline{V}_c$ is only indicated for $V_{c,g}$. In this case, for g'≠g, $\Delta V_{g'}$ is only indicated since $V_{c,g'}=V_{c,g}+\Delta V_{g'}$.

In one example, the group index corresponding to the representative coefficient matrix is configured. In another example, the group index corresponding to the representative coefficient matrix is fixed or pre-determined, e.g., $\overline{V}c=V_{c,1}$ in the case that the representative group equals to 1.

In one example V.2.2.2, each element of $\Delta V_g$ is decomposed into amplitude and phase, and they are selected from respective codebooks. In one example, a phase codebook is fixed, e.g., 8PSK (3-bit). In another example, a phase codebook is configured by NW. For example, 8PSK or 16PSK is selected and indicated by NW. In one example, an amplitude codebook is fixed, e.g., a codebook having equidistant points in [0, Z] in dB scale, where Z≤X, and X is the max value in an amplitude codebook for $\overline{V}_c$. In other words, a finer granularity of amplitude codebook is used for $\Delta V_g$.

In one embodiment V.2.3, a matrix stacking {$V_{c,g}$} vertically is decomposed into:

$$\begin{bmatrix} V_{c,1} \\ \vdots \\ V_{c,G} \end{bmatrix} = V_{vert,1} V_{vert,2},$$

where $V_{vert,1}$ is a $\Sigma_g L_g \times P$ basis matrix and $V_{vert,2}$ is a P×M coefficient matrix for the stacking matrix. $V_{vert,1}$ and $V_{vert,2}$ are indicated for UE to construct {$V_{c,g}$}.

In one embodiment V.2.3.1, the basis matrix $V_{vert,1}$ for the stacking matrix is selected from a set of oversampled DFT vectors and indicated to the UE. In one example, for a given S and oversampled factor $O_3$, a DFT vector $v_{vert,i}$ can be expressed as $$v_{vert,i} = \frac{1}{\sqrt{L'}} \begin{bmatrix} 1 & e^{j\frac{2\pi i}{O_3 L'}} & \ldots & e^{j\frac{2\pi i (L'-1)}{O_3 L'}} \end{bmatrix}^T,$$

where i ∈ {0,1, . . . , $O_3L'$−1}.

In one embodiment V.2.3.2, elements of $V_{vert,2}$ are decomposed into amplitude and phase values, and they are selected from different quantized codebooks and indicated to the UE.

In one example V.2.3.2.1, a bitmap is used to indicate the location (or indices) of the non-zero coefficients of the $V_{vert,2}$ matrix. The amplitude/phase of the NZ coefficients are indicated, and that of the remaining coefficients are not indicated, and the remaining coefficients values are set to 0.

In one example V.2.3.2.2, a strongest coefficient indicator (SCI) is used to indicate the location (or index) of the strongest coefficient of the $V_{vert,2}$ matrix. The amplitude and phase of the strongest coefficient are set to a fixed value, e.g., 1, and are hence not indicated.

In one example V.2.3.2.3, amplitude and phase of the non-zero coefficients of the $V_{vert,2}$ matrix are indicated to the UE using respective codebooks. In one example, the phase codebook is fixed, e.g., QPSK or 8PSK or 16PSK. In one example, the phase codebook is configured, e.g., from QPSK (2-bit), 8PSK (3-bit per phase) and 16PSK (4-bit per phase). In one example, amplitudes are selected from a codebook having equidistant points in [0, X] in dB scale, e.g., X=1.

Any of the above variation embodiments can be utilized independently or in combination with at least one other variation embodiment.

Figure 22:
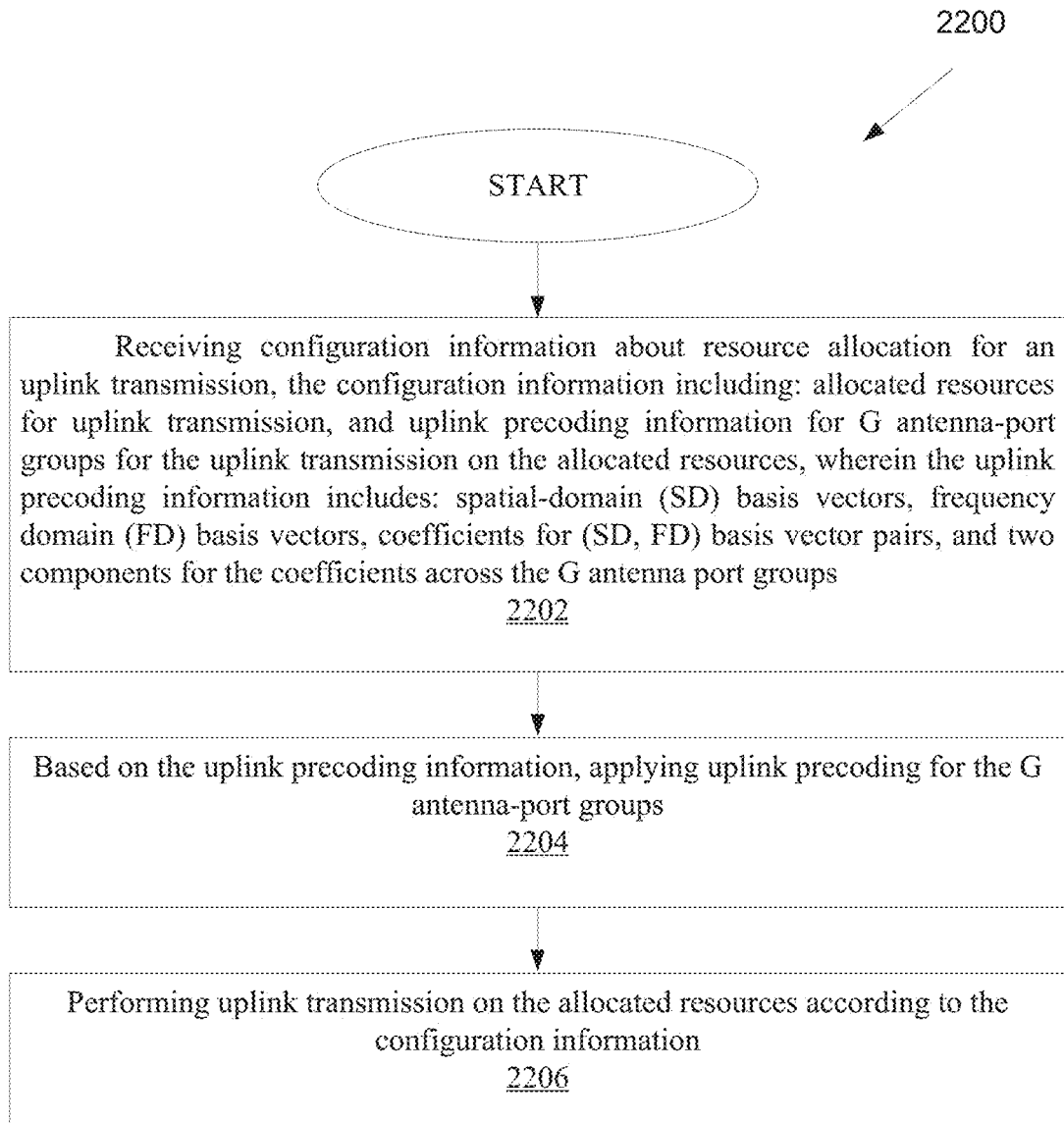
FIG. 22 illustrates a flow chart of a method for operating a UE according to embodiments of the present disclosure.

FIG. 22 illustrates a flow chart of a method 2200 for operating a user equipment (UE), as may be performed by a UE such as UE 116, according to embodiments of the present disclosure. The embodiment of the method 2200 illustrated in FIG. 22 is for illustration only. FIG. 13 does not limit the scope of this disclosure to any particular implementation.

As illustrated in FIG. 22, the method 2200 begins at step 2202. In step 2202, the UE (e.g., 111-116 as illustrated in FIG. 1) receives configuration information about resource allocation for an uplink transmission, the configuration information including: allocated resources for uplink transmission, and uplink precoding information for G antenna port groups for the uplink transmission on the allocated resources, wherein the uplink precoding information includes: SD basis vectors, FD basis vectors, coefficients for (SD, FD) basis vector pairs, and two components for the coefficients across the G antenna port groups.

In step 2204, based on the uplink precoding information, the UE applies uplink precoding for the G antenna port groups.

In step 2206, the UE performs uplink transmission on the allocated resources according to the configuration information.

In one embodiment, the two components include coefficients for a reference group among the G antenna port groups and differential coefficients for remaining G-1 antenna port groups.

In one embodiment, the coefficients for the reference group are indicated using a first granularity amplitude codebook and the differential coefficients are indicated using a second granularity amplitude codebook.

In one embodiment, the second granularity amplitude codebook includes a shorter range of quantization values than that of the first granularity amplitude codebook.

In one embodiment, the two components include third-domain (TD) basis vectors for a concatenated coefficient matrix including the coefficients across the G antenna port groups, and coefficients for the TD basis vectors.

In one embodiment, the TD basis vectors are indicated using a set of oversampled discrete Fourier transform (DFT) vectors, and the coefficients for the TD basis vectors are indicated using phase and amplitude codebooks.

In one embodiment, the SD basis vectors are independently indicated per group and the FD basis vectors are commonly indicated across the groups.

Figure 23:
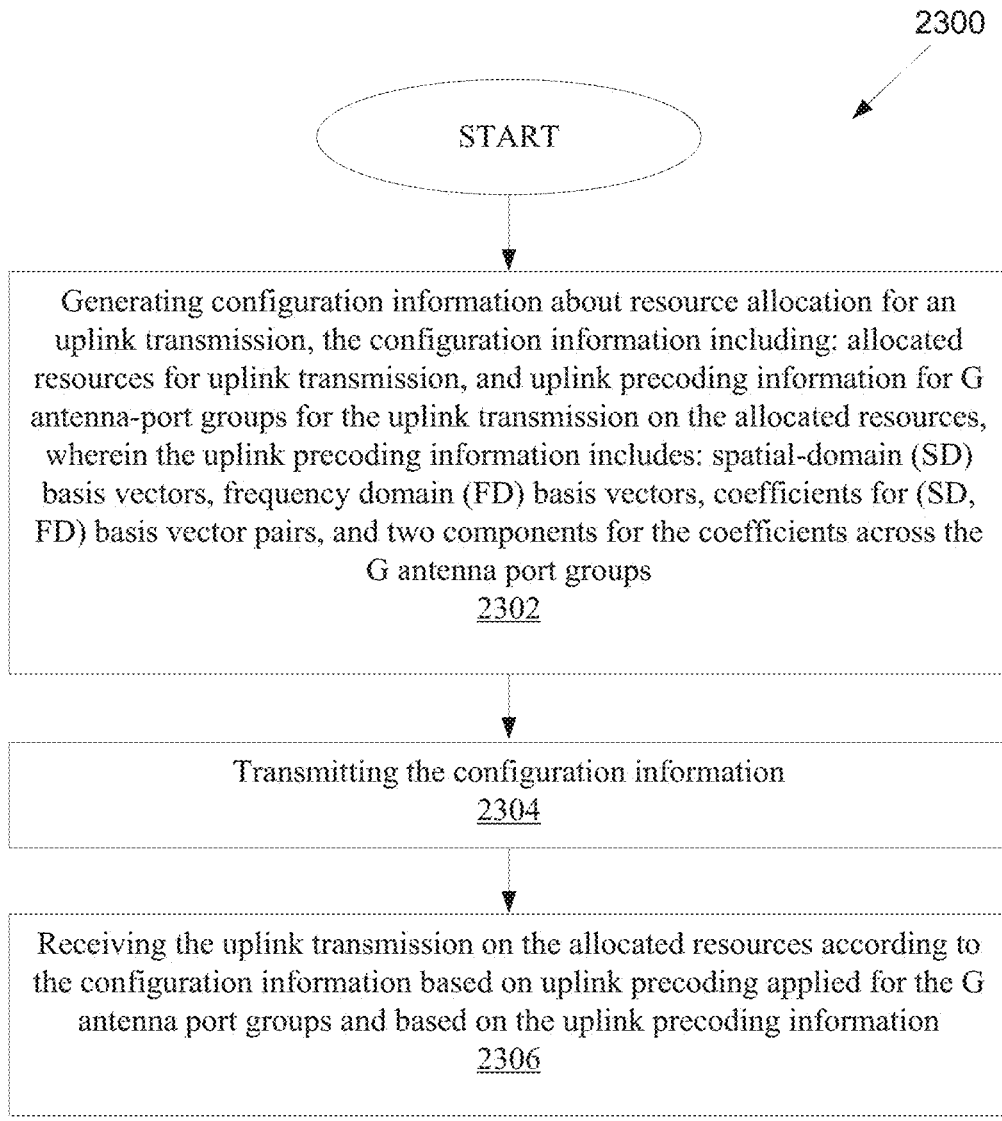
FIG. 23 illustrates a flow chart of a method for operating a BS according to embodiments of the present disclosure.

FIG. 23 illustrates a flow chart of another method 2300, as may be performed by a base station (BS) such as BS 102, according to embodiments of the present disclosure. The embodiment of the method 2300 illustrated in FIG. 23 is for illustration only. FIG. 23 does not limit the scope of this disclosure to any particular implementation.

As illustrated in FIG. 23, the method 2300 begins at step 2302. In step 2302, the BS (e.g., 101-103 as illustrated in FIG. 1), generates configuration information about resource allocation for an uplink transmission, the configuration information including: allocated resources for uplink transmission, and uplink precoding information for G antenna port groups for the uplink transmission on the allocated resources, wherein the uplink precoding information includes: spatial-domain (SD) basis vectors, frequency domain (FD) basis vectors, coefficients for (SD, FD) basis vector pairs, and two components for the coefficients across the G antenna port groups.

In step 2304, the BS transmits the configuration information.

In step 2306, the BS receives the uplink transmission on the allocated resources according to the configuration information based on uplink precoding applied for the G antenna port groups and based on the uplink precoding information.

In one embodiment, the two components include coefficients for a reference group among the G antenna port groups and differential coefficients for remaining G-1 antenna port groups.

In one embodiment, the coefficients for the reference group are indicated using a first granularity amplitude codebook and the differential coefficients are indicated using a second granularity amplitude codebook.

In one embodiment, the second granularity amplitude codebook includes a shorter range of quantization values than that of the first granularity amplitude codebook.

In one embodiment, the two components include third-domain (TD) basis vectors for a concatenated coefficient matrix including the coefficients across the G antenna port groups, and coefficients for the TD basis vectors.

In one embodiment, the TD basis vectors are indicated using a set of oversampled discrete Fourier transform (DFT) vectors, and the coefficients for the TD basis vectors are indicated using phase and amplitude codebooks.

In one embodiment, the SD basis vectors are independently indicated per group and the FD basis vectors are commonly indicated across the groups.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver configured to:
receive configuration information about resource allocation for an uplink transmission, the configuration information indicating:
allocated resources for uplink transmission, and
uplink precoding information for G antenna port groups for the uplink transmission on the allocated resources, wherein the uplink precoding information indicates:
spatial-domain (SD) basis vectors,
frequency domain (FD) basis vectors,
coefficients for (SD, FD) basis vector pairs, and
two components for the coefficients across the G antenna port groups; and a processor operably coupled to the transceiver, the processor configured, based on the uplink precoding information, to apply uplink precoding for the G antenna port groups;

wherein the transceiver is further configured to perform uplink transmission on the allocated resources according to the configuration information.

2. The UE of claim 1, wherein the two components include coefficients for a reference group among the G antenna port groups and differential coefficients for remaining G-1 antenna port groups.

3. The UE of claim 2, wherein the coefficients for the reference group are indicated using a first granularity amplitude codebook and the differential coefficients are indicated using a second granularity amplitude codebook.

4. The UE of claim 3, wherein the second granularity amplitude codebook includes a shorter range of quantization values than that of the first granularity amplitude codebook.

5. The UE of claim 1, wherein the two components include third-domain (TD) basis vectors for a concatenated coefficient matrix including the coefficients across the G antenna port groups, and coefficients for the TD basis vectors.

6. The UE of claim 5, wherein the TD basis vectors are indicated using a set of oversampled discrete Fourier transform (DFT) vectors, and the coefficients for the TD basis vectors are indicated using phase and amplitude codebooks.

7. The UE of claim 1, wherein the SD basis vectors are independently indicated per group and the FD basis vectors are commonly indicated across the groups.

8. A base station (BS) comprising:
a processor configured to generate configuration information about resource allocation for an uplink transmission, the configuration information indicating:
allocated resources for uplink transmission, and
uplink precoding information for G antenna port groups for the uplink transmission on the allocated resources, wherein the uplink precoding information indicates:
spatial-domain (SD) basis vectors,
frequency domain (FD) basis vectors,
coefficients for (SD, FD) basis vector pairs, and
two components for the coefficients across the G antenna port groups; and
a transceiver operably coupled to the processor, the transceiver configured to:
transmit the configuration information; and
receive the uplink transmission on the allocated resources according to the configuration information based on uplink precoding applied for the G antenna port groups and based on the uplink precoding information.

9. The BS of claim 8, wherein the two components include coefficients for a reference group among the G antenna port groups and differential coefficients for remaining G-1 antenna port groups.

10. The BS of claim 9, wherein the coefficients for the reference group are indicated using a first granularity amplitude codebook and the differential coefficients are indicated using a second granularity amplitude codebook.

11. The BS of claim 10, wherein the second granularity amplitude codebook includes a shorter range of quantization values than that of the first granularity amplitude codebook.

12. The BS of claim 8, wherein the two components include third-domain (TD) basis vectors for a concatenated coefficient matrix including the coefficients across the G antenna port groups, and coefficients for the TD basis vectors.

13. The BS of claim 12, wherein the TD basis vectors are indicated using a set of oversampled discrete Fourier transform (DFT) vectors, and the coefficients for the TD basis vectors are indicated using phase and amplitude codebooks.

14. The BS of claim 8, wherein the SD basis vectors are independently indicated per group and the FD basis vectors are commonly indicated across the groups.

15. A method for operating a user equipment (UE), the method comprising:
receiving configuration information about resource allocation for an uplink transmission, the configuration information indicating:
allocated resources for uplink transmission, and
uplink precoding information for G antenna port groups for the uplink transmission on the allocated resources, wherein the uplink precoding information indicates:
spatial-domain (SD) basis vectors,
frequency domain (FD) basis vectors,
coefficients for (SD, FD) basis vector pairs, and
two components for the coefficients across the G antenna port groups;
based on the uplink precoding information, applying uplink precoding for the G antenna port groups; and
performing uplink transmission on the allocated resources according to the configuration information.

16. The method of claim 15, wherein the two components include coefficients for a reference group among the G antenna port groups and differential coefficients for remaining G-1 antenna port groups.

17. The method of claim 16, wherein the coefficients for the reference group are indicated using a first granularity amplitude codebook and the differential coefficients are indicated using a second granularity amplitude codebook.

18. The method of claim 17, wherein the second granularity amplitude codebook includes a shorter range of quantization values than that of the first granularity amplitude codebook.

19. The method of claim 15, wherein the two components include third-domain (TD) basis vectors for a concatenated coefficient matrix including the coefficients across the G antenna port groups, and coefficients for the TD basis vectors.

20. The method of claim 19, wherein the TD basis vectors are indicated using a set of oversampled discrete Fourier transform (DFT) vectors, and the coefficients for the TD basis vectors are indicated using phase and amplitude codebooks.

* * * * *